United States Patent [19]
Underwood

[11] Patent Number: 5,674,113
[45] Date of Patent: *Oct. 7, 1997

[54] CLIP-ON SUNGLASSES AND SYSTEM FOR CUTTING CLIP-ON SUNGLASSES

[76] Inventor: Ronald L. Underwood, 4242 DeFeyter Ave., Holland, Mich. 49424

[ * ] Notice: The term of this patent shall not extend beyond the expiration date of Pat. No. 5,431,595.

[21] Appl. No.: 631,450

[22] Filed: Apr. 12, 1996

Related U.S. Application Data

[63] Continuation of Ser. No. 237,063, Jun. 9, 1994, Pat. No. 5,546,140, which is a continuation-in-part of Ser. No. 121,211, Sep. 14, 1993, Pat. No. 5,431,595, which is a continuation-in-part of Ser. No. 105,339, Aug. 11, 1993, Pat. No. 5,423,712.

[51] Int. Cl.[6] .................................................. B24B 9/00
[52] U.S. Cl. ....................... 451/237; 451/43; 451/390; 451/240
[58] Field of Search ........................... 451/43, 231, 233, 451/237, 240, 384, 390, 460

[56] References Cited

U.S. PATENT DOCUMENTS

| | | | |
|---|---|---|---|
| 3,555,739 | 1/1971 | Novak | 51/101 LG |
| 3,672,855 | 6/1972 | Bright | 51/101 LG |
| 3,786,600 | 1/1974 | Bloxsom | 51/101 LG |
| 5,333,412 | 8/1994 | Matsuyama | 451/240 |

*Primary Examiner*—Eileen P. Morgan
*Attorney, Agent, or Firm*—Price, Heneveld, Cooper, DeWitt & Litton

[57] ABSTRACT

Clip-on sunglasses and an apparatus for custom cutting the clip-on sunglasses. The system includes a holder which assists in positioning the sunglasses on the system. The sunglasses include a pair of lenses interconnected by a bridge specifically dimensioned to be received by the holder. The bridge and holder are intended to be used in combination to produce custom clip-on sunglasses which can form in shape and size to the frame of the eyeglasses.

9 Claims, 15 Drawing Sheets

5,674,113

CLIP-ON SUNGLASSES AND SYSTEM FOR CUTTING CLIP-ON SUNGLASSES

CROSS-REFERENCE TO RELATED APPLICATIONS

This is a continuation of U.S. application Ser. No. 08/237,063, filed Jun. 9, 1994, which is now U.S. Pat. No. 5,546,140, which is a continuation-in-part of U.S. application Ser. No. 08/121/211, filed Sep. 14, 1993, now U.S. Pat. No. 5,431,595, which is a continuation-in-part of U.S. application Ser. No. 08/105,339, filed Aug. 11, 1993, which is now U.S. Pat. No. 5,432,712.

BACKGROUND OF THE INVENTION

The invention pertains to clip-on sunglasses, and particularly to an apparatus for custom cutting clip-on sunglasses to the shape of eyeglasses, and more particularly to a unique clip-on sunglasses.

People enjoy wearing sunglasses to improve their vision and comfort on sunny days as sunglasses reduce glare and shade the eyes. A variety of low cost sunglasses are readily available for people who do not require corrective lenses. However, for people with poor vision who require corrective eyeglasses, sunglasses are expensive. Additionally, new prescription sunglasses must be purchased each time the wearer's vision changes. For people who change prescriptions often, the cost of purchasing prescription sunglasses each time new eyeglasses are required is prohibitive. Accordingly, wearers of prescription eyeglasses may use old prescription sunglasses which do not provide adequate vision correction, or they may go without sunglasses.

Clip-on sunglasses are a low-cost alternative to prescription sunglasses. Clip-on sunglasses clip over conventional prescription glasses to convert these eyeglasses into sunglasses. Although they provide a cost effective solution to the problem of providing sunglasses for people who require corrective vision, clip-on sunglasses are unattractive since they are manufactured in a limited number of shapes and sizes and do not conform to the shape of the eyeglasses. Because people are very conscious of their appearance, opticians cut clip-on sunglasses to the shape of eyeglasses using scissors in an attempt to provide more attractive clip-on sunglasses. Not only is this time consuming to the optician, errors are made during cutting of the sunglasses which necessitates throwing away some clip-on sunglasses and starting again on a new pair of sunglasses. As a consequence, opticians typically do not make a profit on these clip-on sunglasses, and may in fact lose money selling custom fit sunglasses. Additionally, the sunglasses will have rough edges which are unattractive. Because people are concerned about their appearance, they typically will not wear these clip-on sunglasses.

Accordingly, it is desirable to provide a system which facilitates quick and accurate cutting of clip-on sunglasses to a desired shape and size. It is further desirable to achieve this goal in a manner which minimizes the possibility of operator errors which would otherwise destroy the clip-on sunglasses.

SUMMARY OF THE INVENTION

The present invention provides an apparatus and method for reliably producing custom fit clip-on sunglasses which conform to the shape of any pair of prescription eyeglasses, and are attractive in appearance. The apparatus is easy to use and the method may be carried out by an unskilled operator to effectively, create sunglasses having the same shape as any pair of prescription eyeglasses.

According to one aspect of the invention, an apparatus for custom cutting clip-on sunglasses includes a body. A holder is supported on the body and holds the eyeglasses or sunglasses. The glasses are in a predetermined position on the holder, which position is located by a centerer. According to another aspect of the invention, the position is located by a stop.

More specifically, a system is disclosed for cutting a specific style of sunglass blanks which are also a part of the invention. The apparatus is easy to use consistently, and without error by an unskilled operator to position sunglasses or eyeglasses in a predetermined position. In one particularly advantageous embodiment of the invention, a system for cutting clip-on sunglasses includes positioning apparatus for sunglasses and eyeglasses at predetermined relative positions. A cutter and stylus are used to trace the eyeglasses and cut the sunglasses whereby the sunglasses are custom cut to the shape of the eyeglasses. Because the eyeglasses and sunglasses are readily precisely located, the operator will not destroy sunglasses while attempting to cut them to the shape of the eyeglasses.

These and other aspects, features, and advantages of the invention will be further understood and appreciated by those skilled in the art by reference to the following written specification, claims and appended drawings.

BRIEF DESCRIPTION OF THE INVENTION

DETAILED DESCRIPTION OF THE PREFERRED EMBODIMENTS

Figure 1:
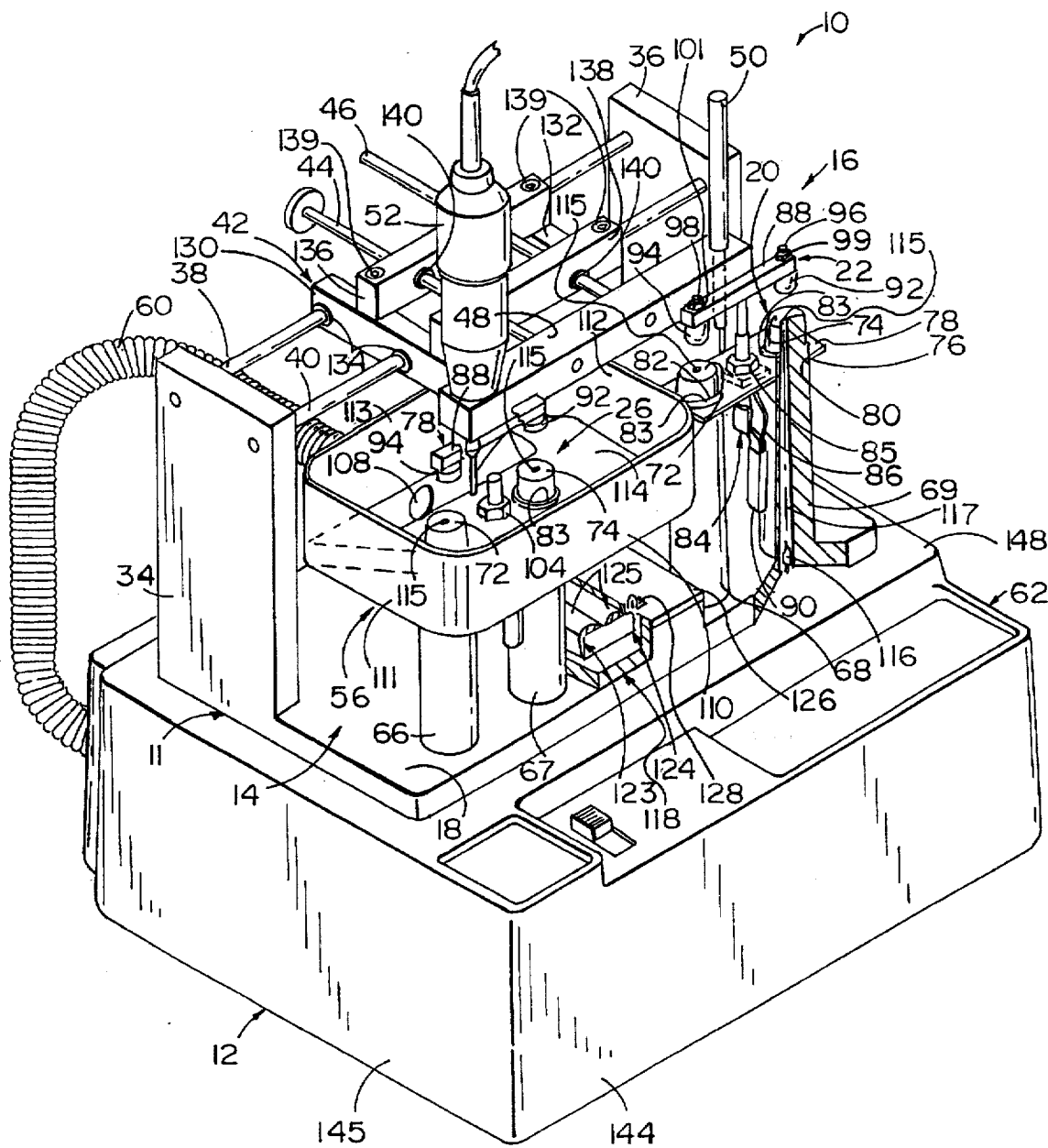
FIG. 1 is a perspective view of a system for cutting clip-on sunglasses.
Figure 5:
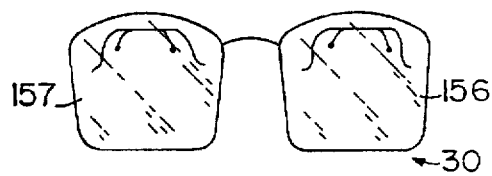
FIG. 5 is a front elevational view of a clip-on sunglasses blank for use with the system according to FIG. 1.

A system 10 for custom cutting clip-on sunglasses according to a preferred embodiment of the invention is illustrated in FIG. 1. System 10 includes a housing 11 having a base 12, a body 14 supported on base 12, and a cutting mechanism 16 supported on body 14. Body 14 includes a foot 18 attached to the top of base 12. An eyeglass holder 20 projects upwardly from foot 18 and includes a clamp assembly 22 for retaining eyeglasses 24 (FIG. 6) during tracing, as described in greater detail hereinbelow. A holder 26 (FIG. 1) for sunglasses 30 (FIGS. 5, 7, and 8) projects upwardly from foot 18. Holder 26 (FIG. 7) is spaced a predetermined distance from eyeglasses holder 20 and includes a clamp assembly 28 for retaining clip-on sunglasses 30 (FIG. 5) during cutting. Body 14 thus positions the eyeglasses 24 and sunglasses 30 in a predetermined spaced relationship. A pair of arms 34, 36 extend upwardly from foot 18 for supporting tracks, or slide shafts 38, 40. Tracks 38, 40 extend the full length between arms 34, 36, and provide a rail upon which the cutting mechanism travels laterally.

Cutting mechanism 16 includes a platform 42 which travels on tracks 38, 40. A pair of tracks, or slide shafts 44, 46, extend through platform 42. A shoulder 48 is attached to one end of tracks 44, 46 such that movement of shoulder 48 forward and backward moves tracks 44, 46 in the platform. A guide, or stylus, 50 is supported on one end of shoulder 48 and a cutter 52 is supported on the other end of shoulder 48. Shoulder 48 travels in a horizontal plane on tracks 38, 40, 44, and 46 to allow guide 50 to trace eyeglasses 24, and cutter 52 moves with stylus 50 to cut sunglasses 30, as described in greater detail hereinbelow.

Figure 7:
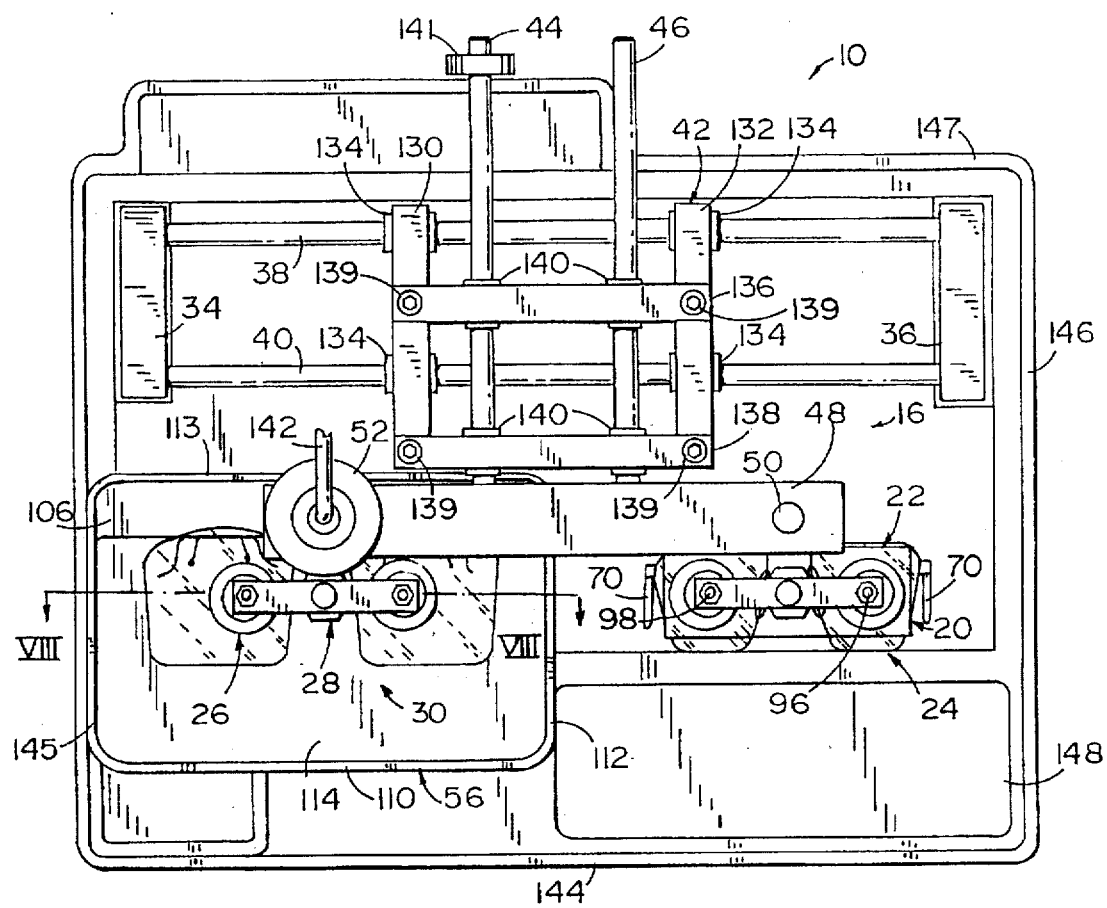
FIG. 7 is a top plan view similar to FIG. 4 with eyeglasses and sunglasses clasped in the holders of the system according to FIG. 1.

Holder 26 (FIG. 1) for sunglasses includes a receptacle 56 for catching cuttings and shavings from sunglasses 30 (FIG. 7). A vacuum 58 (FIG. 4) is supported within base 12 and operably coupled to receptacle 56 through a hose 60. Vacuum 58 collects the cuttings and shavings caught in receptacle 56. The vacuum is enclosed in a generally rectangular housing 62 which helps to dampen the noise from the vacuum.

Somewhat more particularly, and with reference to FIG. 1, the body 14 includes foot 18, arms 34, 36, and vertical, cylindrical columns 66–69 which are preferably integrally formed, and have a diameter which continuously, gradually decreases from the bottom to the top of the column. The body may be of any suitable, conventional integral construction such as an integrally formed sand cast aluminum or an integrally molded organic polymer. The body may alternately comprise separately formed components which are assembled by conventional means, such as welding or use of fasteners. Integrally formed body 14 is preferred since it is strong, and it is less costly to manufacture because it does not require assembly.

With continued reference to FIG. 1, cylindrical columns 68, 69 extend substantially orthogonally from foot 18 and provide a base for the eyeglasses holder. Additionally, the columns are sufficiently long that the ear piece 70 (FIG. 8) for the eyeglasses can hang down freely when lenses 152, 154 (FIG. 6) are positioned on lens contact surfaces 72 (FIG. 1) and 74. Each of the columns includes a ledge 76. A clamp mounting plate 78 includes apertures 80, 82 which receive columns 68, 69 when the clamp mounting plate is attached to the columns. The clamp mounting plate is manufactured of a suitable rigid material such as aluminum bar stock. Plate 78 rests on ledges 76 when the plate is fully, and properly, installed. Plate 78 is preferably fixedly attached to columns 68, 69 using solder, an adhesive, threaded fasteners (not shown), a compressive retainer 83, or the like.

Figure 8:
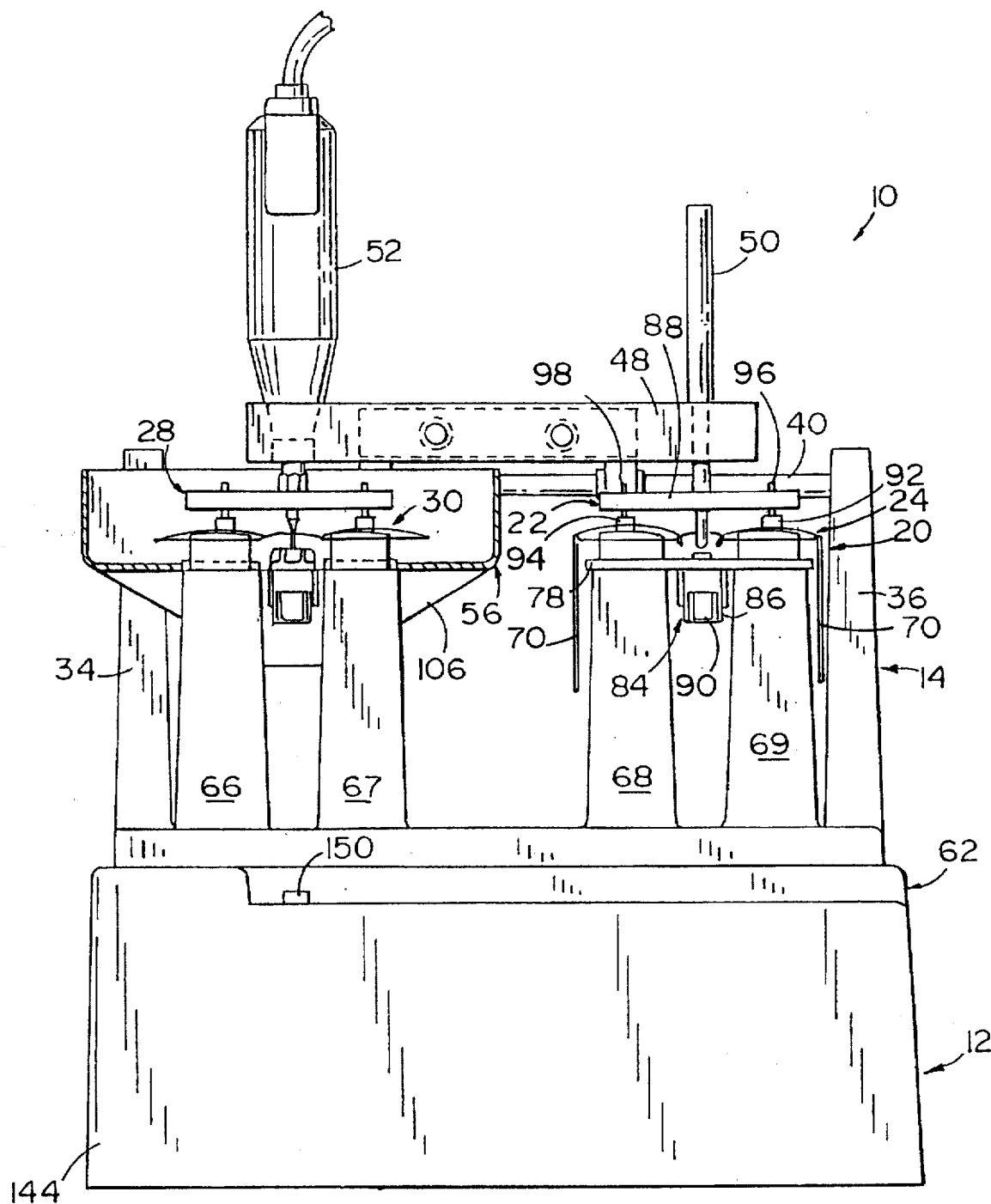
FIG. 8 is a front elevational view with a portion of the system cut away along plane VIII—VIII in FIG. 7 and including eyeglasses and sunglasses clasped in the holders of the system according to FIG. 1.

A clamp assembly 22 is mounted on clamp mounting plate 78 to hold fast the eyeglasses in holder 20. The clamp assembly includes a clamp 86. A commercially available TC-602 push-pull clamp available from DeSTACO Inc. is preferably used, as it effects a secure clamping action and is easily operated. The clamp is secured to plate 78 by a hex nut 85. Clamp 86 is attached to a clamp bar 88 such that operation of a handle 90 moves clamp bar 88 toward and away from surfaces 72, 74. The clamp bar includes rubber caps 92 (FIG. 3A) and 94 on opposite ends of clamp bar 88. Rubber caps 92, 94 are supported on spindles 96, 98. The spindles 96, 98 are attached to bar 88 using hex nuts 99, 101, pins, or the like. The rubber caps 92, 94 project downwardly to contact eyeglasses resting on surfaces 72, 74 when clamp assembly 22 is closed, as shown in FIG. 8. Spindles 96, 98 may be provided by any commercially available spindle, and are preferably TC-205203 spindle assemblies available from DeSTACO Inc. Rubber caps 92, 94 may be any commercially available caps, and are preferably TC-215119 rubber caps available from DeSTACO Inc.

Figure 3:
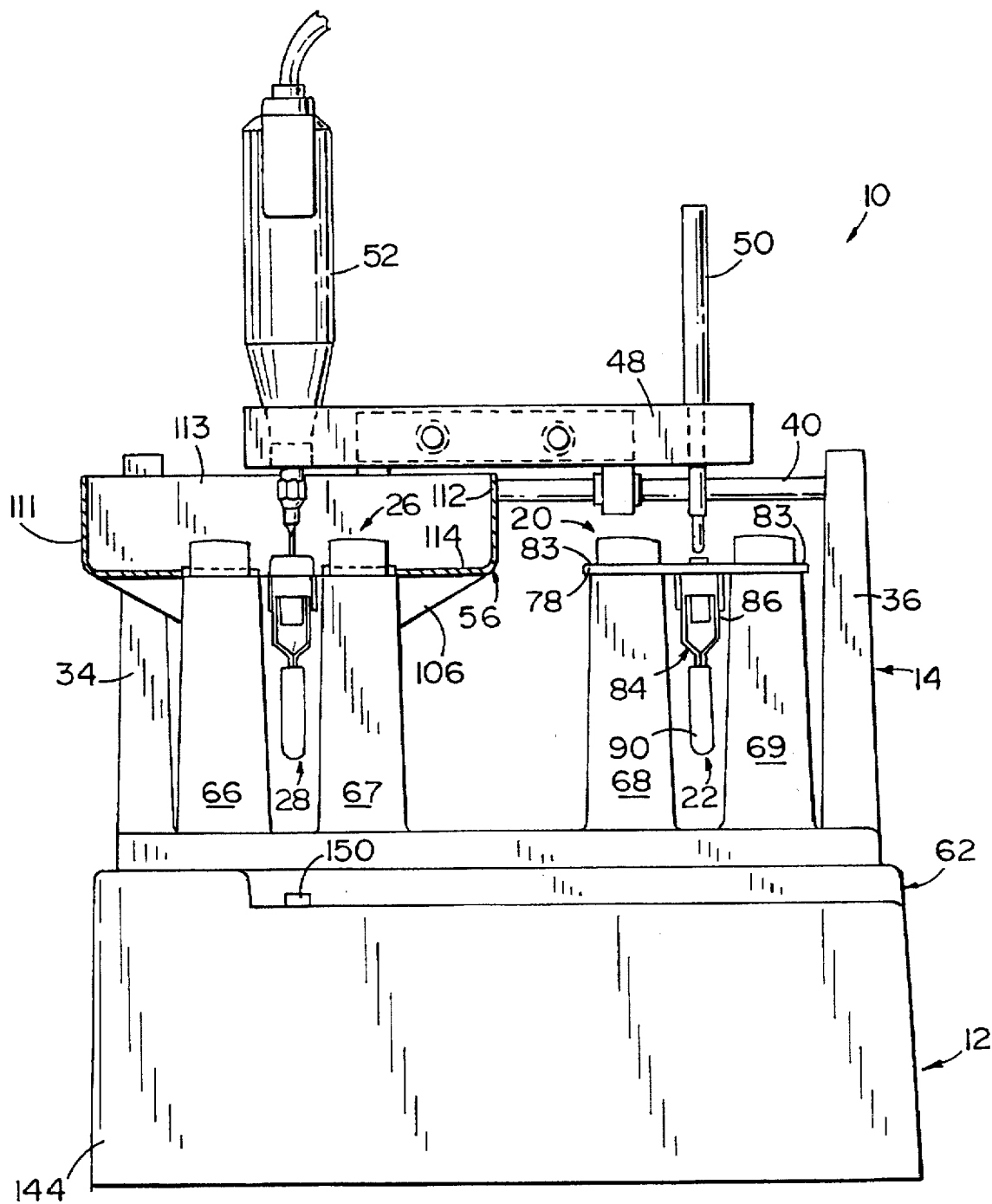
FIG. 3 is a partial sectional front elevational view taken along plane III—III in FIG. 2.
Figure 3A:
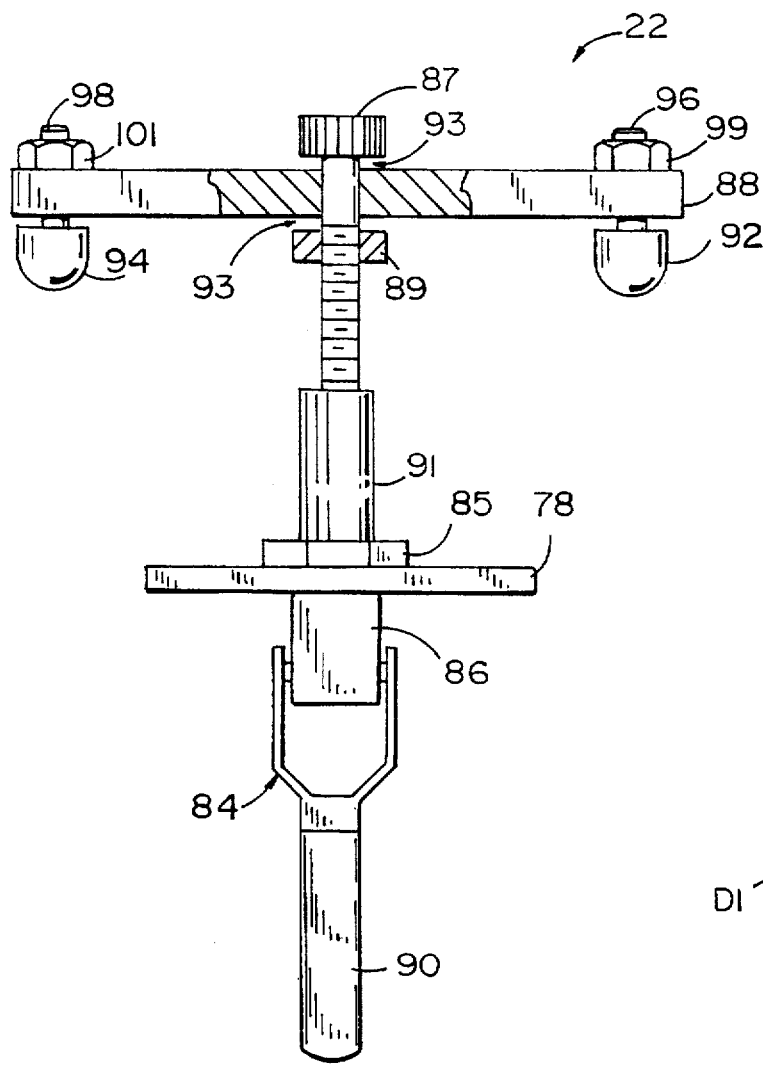
FIG. 3A is an exploded front elevational view, partially broken away, of the clamp assembly in FIG. 3.
Figure 6:
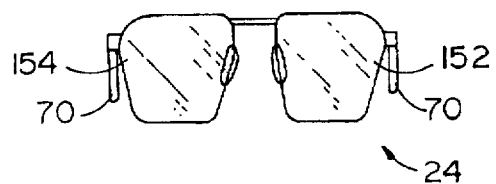
FIG. 6 is a front elevational view of eyeglasses for tracing on the system according to FIG. 1.

More particularly, and with reference to FIG. 3A, the clamp bar 88 is carried between the head of a ¼–20×1.75 S.H.C.S. bolt 87 and a ¼×20 hex nut 89. The bolt is screwed into spindle 91 of clamp 86, which Spindle is internally threaded. A gap 93 exists between the head of bolt 87 and nut 89. Bolt 87 is rotated clockwise and counterclockwise to adjust the distance between nut 89 and the end of spindle 91, which is fixed on plate 78. This rotation of bolt 87 thus also effects a change in the distance between pads 92, 94 and surfaces 72 (FIG. 1), 74. Accordingly, the clamping pressure may be adjusted using bolt 87 (FIG. 3A) to adjust for different thicknesses of lenses 152, 154 (FIG. 6).

Holder 26 (FIG. 1) for sunglasses 30 (FIG. 5) includes columns 66 (FIG. 1), 67, receptacle 56, and clamp assembly 28. Cylindrical columns 66, 67 and clamp assembly 28 are identical to columns 68,69 and clamp assembly 22. Thus, columns 68, 69 include a ledge 76. Receptacle 56 includes two apertures (not shown) which receive columns 66, 67. Receptacle 56 rests on ledges 76 of columns 68, 69 when the receptacle is fully installed on the columns. Receptacle 56 is preferably fixedly attached to columns 68, 69 using solder, an adhesive, threaded fasteners, a compressive retainer 83, or the like. Clamp assembly 28, which is identical to clamp assembly 22, is attached to receptacle 56 using a hex nut 104.

Figure 4:
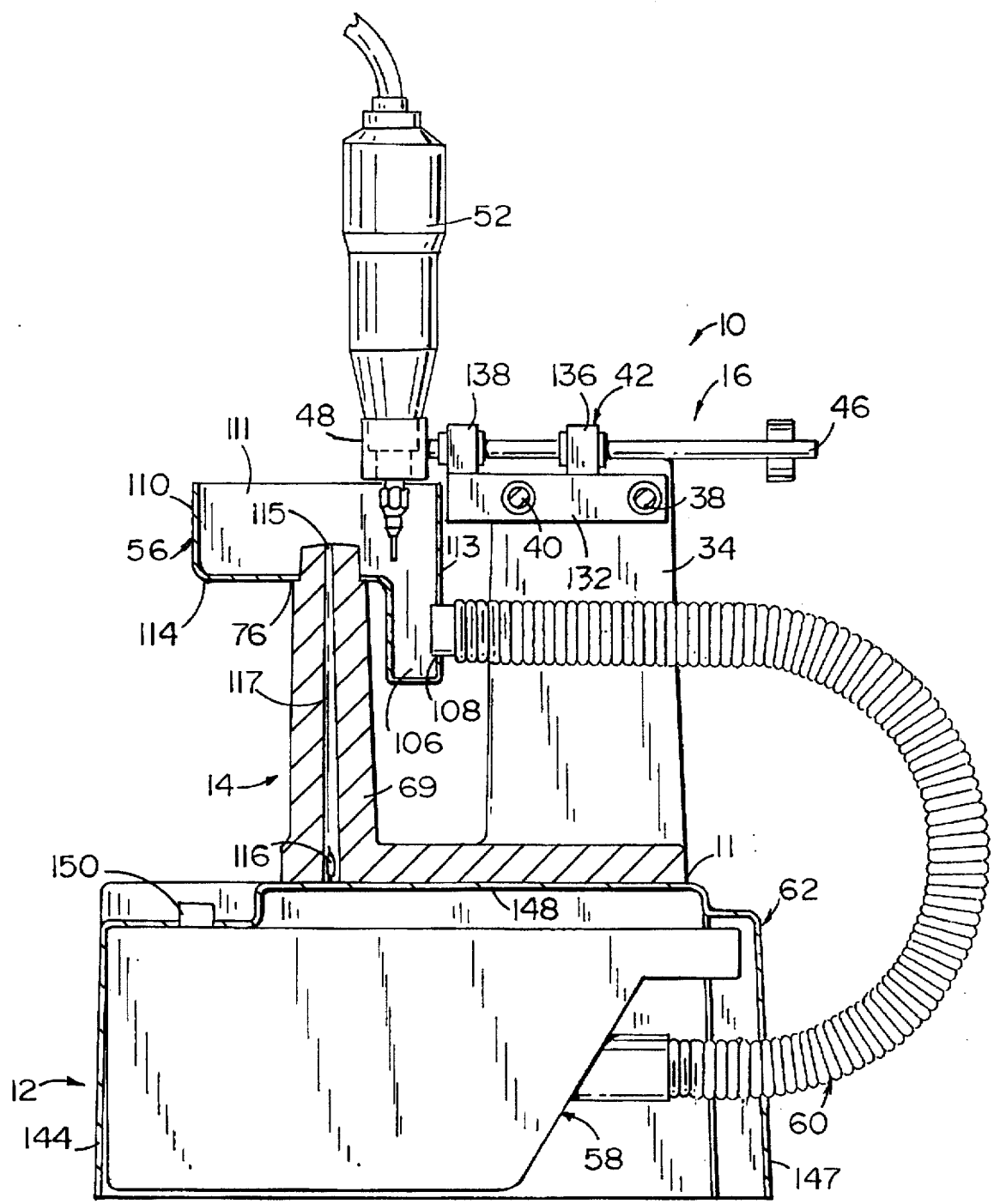
FIG. 4 is a partial cross sectional view of the system according to FIG. 1 taken along plane IV—IV in FIG. 2.

As mentioned above, receptacle 56 (FIG. 1) catches cuttings and shavings which cutter 52 removes from the sunglasses blank. The receptacle is generally rectangular, including a front wall 110, sidewalls 111, 112, a back wall 113, and a bottom 114. To improve the suction within the receptacle, a downwardly extending V-shaped funnel 106 (FIG. 3) is provided at the back of the receptacle and an aperture 108 (FIG. 1) extends through the back wall 110 at the bottom of the funnel. The funnel creates additional suction within receptacle 56 by which the cuttings are drawn into the vacuum 58 (FIG. 4). Aperture 108 may alternately be a horizontal opening at the lowest point of funnel 106 such that hose 60 is oriented vertically at the joinder of hose 60 and funnel 106. In either case, hose 60 is attached to receptacle 56 at aperture 108. A flange may be provided around the aperture for receipt inside hose 60. The hose may be attached to receptacle 56 at the flange using an adhesive, a clamp (not shown) compressed over the hose, or the like. The receptacle may be of any suitable construction using a metal or an organic polymer, and is preferably vacuum formed ABS.

Each of columns 66–69 (FIG. 1) includes a respective locator 115 centrally positioned on the top surface 72, 74 to assist in positioning the eyeglasses and sunglasses in holders 20, 26, as described in greater detail hereinbelow. The locator may be printed on top surface 72, 74 of each column. Preferably, each locator provides an "X" shaped alignment target in a respective surface 72, 74. The locator for each of columns 66–69 may be provided by a lamp 116 mounted at the bottom of the columns (only the locator for column 69 is described herein for brevity, since all the locators are identical thereto). A light guide 117 extends between lamp 116 and a central opening in surface 74. The opening may be sealed with a transparent cover (not shown) to prevent debris from falling into the light guide, which debris might otherwise block the light guide. Lamp 116 may be a 272-1098 min. lamp available from ARCHER Inc. Light guide 117 may be a central tube integrally formed with the column.

A battery housing 118 (FIG. 1) is provided in foot 18. The battery housing includes four, rectangular walls (not shown) which extend upwardly from the horizontal base of foot 18. The walls are preferably integrally formed with the horizontal base of foot 18. A battery holder 123 is mounted to foot 18 within the walls of battery housing 118 using threaded fasteners (not shown), an adhesive, or the like. The battery holder may be provided by any suitable device, such as the 270-391 battery holder available from ARCHER Inc. Four 1.5 Volt, AA batteries are used as a power source for the lamps 116. The power source is connected to one terminal (not shown) of a switch 124 through a wire (not shown). Another terminal (not shown) of switch 124 is connected to each of lamps 116 through respective wires (not shown). When switch 124 is closed, power is supplied to respective lamps 116 associated with each of columns 66–69. When switch 124 is open, respective lamps 116 are all disconnected from the power source, and the lamps are off. The switch may be provided by a commercially available slide switch available from ARCHER Inc. The battery housing is closed by a cover 126. Cover 126 includes an opening 128 through which switch 124 extends. The cover may be formed from the same material as body 14, and thus may be ABS sheet stock or aluminum.

Sliding shafts 38 (FIG. 2) and 40 extend substantially in parallel between arm 34 and arm 36, and provide tracks upon which platform 42 travels laterally. Shafts 38, 40 may be mounted on arms 34, 36 by any conventional means, such as using threaded fasteners (e.g., nuts, not shown, attached to threaded ends of the bar and shaft), pins (not shown) extending through each of the shafts to lock the shafts against movement, welding, an adhesive, or the like. The shafts are of any suitable construction, such as those commercially available from Thompson Industries.

Figure 2:
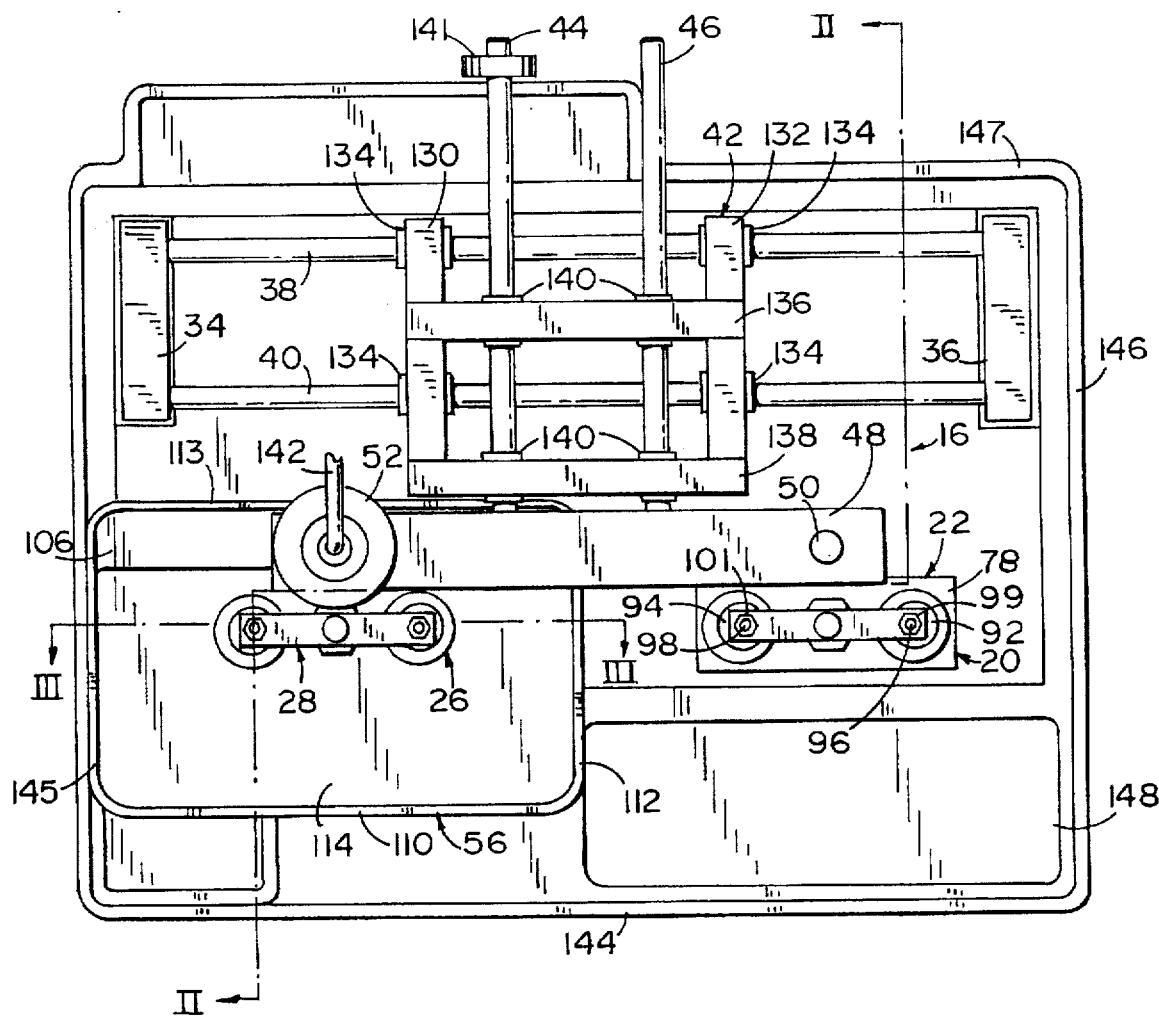
FIG. 2 is a top plan view of the system according to FIG. 1.

A platform 42 (FIG. 2) travels on shafts 38, 40. The platform includes two mounting bars 130, 132 having a longitudinal axis perpendicular to the longitudinal axes of slide shafts 38, 40, as best shown in FIG. 2. Bearings 134 are mounted between mounting bars 130, 132 and each of the slide shafts 38, 40 such that the mounting bars travel easily, without jerking caused by variations in the friction between the mounting bars and the sliding shafts. Two mourning bars 136, 138 are attached to mounting bars 130, 132 using suitable conventional means, such as threaded fasteners 139 (which may be 10–32×1.25 S.H.C.S. screws, four of which may be used to fully assemble the platform), an adhesive, or the like. Mounting bars 136, 138 are arranged orthogonally to mounting bars 130, 132. Bearings 140 are mounted between mounting bars 136, 138 and slide shafts 44, 46. Bearings 134, 140 may be SUPER-6 BALL BUSHINGS commercially available from Thompson Industries.

Slide shafts 44, 46 provide a track which moves through mounting bars 136, 138. Shoulder 48 is fixedly attached to one end of shafts 44, 46 by conventional means, such as welding, threaded fasteners (not shown), pins (not shown), press-fit, or the like. A CTC lock collar 141 is attached to the other end of slide shaft 44 to prevent the slide shafts 44, 46 from sliding out of mounting bars 136, 138. The lock collar may be a 10 and ⅜ commercially available lock collar. Shoulder 48 is manufactured from any suitable material, and may be provided by aluminum bar stock.

A guide, or stylus, 50 (FIG. 1) and a cutter 52, are mounted on shoulder 48. The stylus and cutter are each inserted through respective apertures on opposite ends of the shoulder. Stylus 50 may be secured to the shoulder by welding, use of a fastener, an adhesive, or the like. The stylus may be of any suitable construction, such as cold rolled steel round stock. The cutter is preferably removably secured to the shoulder using the threads on end of cutter 52, a clamp, a retainer ring, or the like. The cutter is provided by a suitable grinder, or drill, and is preferably provided by a Model 275 hand grinder manufactured by DREMEL, and having a carbide routing cutter. The grinder is plugged into an AC wall outlet using a plug (not shown) on the distal end of cord 142.

Figure 3C:
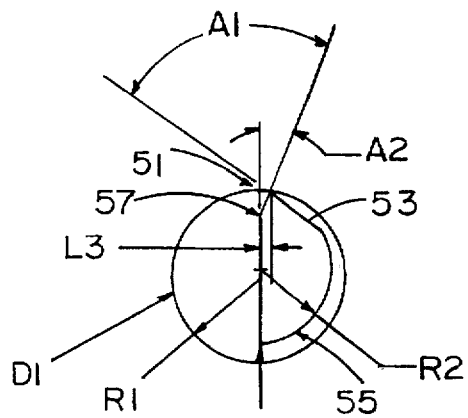
FIG. 3C is an end view of the carbide routing cutter according to FIG. 3B.
Figure 3B:
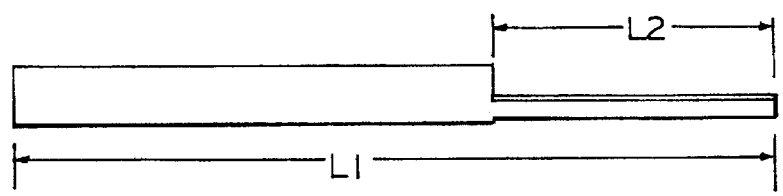
FIG. 3B is an exploded front elevational view of a carbide routing cutter in FIG. 3.

A particularly advantageous carbide routing cutter is disclosed in FIGS. 3B and 3C. The carbide routing cutter includes a cutting edge 51, a primary relief 53, a radial relief 55, and a negative rake 57. The carbide routing cutter may have a length between one-half and two inches, and preferably has a length of approximately one and one-half inches. The radius R1 of the routing cutter is preferably between 0.03 and 0.125 inch, and is most preferably 0.0625 inch. The length L2 of the cutting end is preferably between one-half and one inch, and in a preferred embodiment is approximately 9/16 inch. Angle A1 is between 45 and 75 degrees, and most preferably has an angle of sixty degrees. Angle A2 is between 0 and 30 degrees, and is most preferably 15 degrees. Dimension L3 is between 0 and 0.030 inch, and most preferably is 0.013 inch. The radius R2 of the radial relief is between 0.03 and 0.07 inch, and is most preferably 0.05 inch. The axis for radial relief 55 is approximately 0–0.030 inch above the longitudinal axis CL of the routing cutter. The negative rake is particularly important for effective trimming of the lenses The carbide routing cutter, according to the most preferred embodiment described herein, provides smooth, sharp edges on the lenses.

Base 12 (FIGS. 1 and 4) is a generally rectangular stand, having four walls 144–147 and a top 148. The stand is of any suitable construction, such as vacuum formed ABS. Vacuum 58 is housed within stand 12. The vacuum may be a 4Z904 portable vacuum available from Dayton Inc. The vacuum is turned on and off using a switch 150. The switch is accessible though an opening in the top 148 of stand 12.

To assemble cutter 10 (FIG. 1) for clip-on sunglasses, body 14 is initially attached to base 12. Base 12 and body 14 may be connected by any suitable means, such as threaded fasteners (not shown), an adhesive, retainer clips, or the like. Vacuum cleaner 58 is assembled into housing 62 such that switch 150 projects through top wall 148. An opening is provided in the back wall 147 of base housing 62 (FIG. 4) for removal of vacuum 58 and passage of hose 60. Vacuum 58 is preferably not secured within housing 62, although the vacuum may be secured to the housing using snap connectors, or other releasable fasteners, such that vacuum 58 may be removed from base housing 62. Vacuum 58 is removably connected to permit changing filters and/or bags in the vacuum. The opening in back wall 147 of housing 62 also facilitates the free flow of air out of vacuum 58 and cooling of the vacuum.

The battery holder 123 (FIG. 1) is assembled into battery housing 118 using fasteners, an adhesive, or the like. Switch 124 is then assembled into cover 126 and conductors (not shown) are connected between the batteries 125 and switch 124. Additional wires are connected between switch 124 and the respective lamps 116 associated with each of columns 66–69. Cover 126 is then removably assembled to battery housing 118 using snap connectors, threaded fasteners, or the like. The battery housing cover is removably connected to assist in changing batteries.

Clamp assemblies 22, 28 am then assembled to clamp mounting plate 78 and receptacle 56, respectively. The clamp assemblies are secured to mounting plate 78 and receptacle 56 by respective hex nuts 85 and 104. The mounting plate 78 is then inserted over columns 68, 69 such that it comes to rest on ledges 76. Receptacle 56 is likewise assembled over columns 66, 67 such that it comes to rest on ledges 76. Respective retainer rings 83 are then pressed downwardly onto columns 66–69 to fixedly secure plate 78 and receptacle block 56 onto columns 66–69. Hose 60 is next assembled into aperture 108 and funnel 106.

The cutting mechanism 16 is assembled to body 14 in the following manner. With bushings 134 assembled into bars 130, 132 by conventional means, such as press fitting or snap ring retaining, the mounting bars are slid onto tracks 38, 40. Tracks 38, 40 are attached to arms 34, 36, such that they extend the full distance therebetween. Mounting bars 136, 138 are then assembled to mounting bars 130, 132 using threaded fasteners 139. The interconnected, orthogonally arranged, mounting bars 130, 132, 136, and 138 provide a rigid platform which travels laterally on tracks 38, 40.

Shoulder 48 is attached to tracks 44, 46 using conventional means, such as threaded fasteners, a pin, press fit, or the like, such that the shoulder is securely fastened thereon. Tracks 44, 46 are then inserted through bearings 140, which are mounted within mounting bars 136, 138 by conventional means such as press fit. A CTC lock collar 44 is then fixedly secured to an end of bar 44 opposite shoulder 48 to prevent tracks 44, 46 from sliding out of mounting bars 136, 138. Guide 50 and cutter 52 are then attached to shoulder 48 using any suitable conventional means, such as a retainer, an adhesive, fasteners, or the like.

In operation, lenses 152 (FIG. 6) and 154 of eyeglasses 24 are positioned over surfaces 72 (FIG. 1) and 74 on the ends of columns 68, 69. The approximate center of lenses 152, 154 are positioned over locator 115. The operator then marks the eyeglasses at the position of the locator, as illustrated in FIG. 6, using a suitable writing instrument such as a wax pencil. The operator removes the eyeglasses from eyeglass holder 20 and attaches the clip-on sunglasses over the eyeglasses. The operator then marks the position on the sunglasses lenses 156, 157 (FIG. 5) which is aligned with the marks on lenses 152, 154 (FIG. 6). The eyeglasses are then placed onto surfaces 72 (FIG. 1) and 74 of columns 68, 69, with the marked positions on the eyeglasses aligned with the locators 115. Clamp assembly 22 is closed, as shown in FIG. 8, to hold the glasses securely in position on the eyeglass holder. Clip-on sunglasses 30 are then positioned onto surfaces 72, 74 of columns 66, 67 such that the marked location on each of lenses 156, 157 is positioned over a respective locator 115. The clamp assembly 28 is then closed onto sunglasses 30 to securely hold the sunglasses in a cutting position, as illustrated in FIG. 8. As illustrated in FIG. 7, with both eyeglasses 24 and sunglasses 30 held in their respective holders, guide 50 and cutter 52 are positioned at the same location relative to the sunglasses and eyeglasses (FIG. 7 shows guide 50 and cutter 52 both positioned at the center of the bridge on each of the eyeglasses and the sunglasses).

With cutter 52 turned on, the operator moves guide 50 around eyeglasses 24 to trace the outline of eyeglasses 24. As guide 50 moves, the cutter will move along the sunglasses, cutting off portions of shades 156, 157 which extend beyond lenses 152, 154. After the operator has moved guide 50 such that it has circumscribed the entire perimeter of the eyeglasses, the sunglasses will have been cut to the same shape and dimension as the eyeglasses. Because the bearings are utilized in mounting bars 130, 132, 136, and 138, shoulder 48 moves freely within the horizontal plane extending through the center of shafts 44, 46 as the guide traces the eyeglasses. This allows the operator to move the guides freely with little resistance from guide rails 38, 40, 44, and 46.

Figure 9:
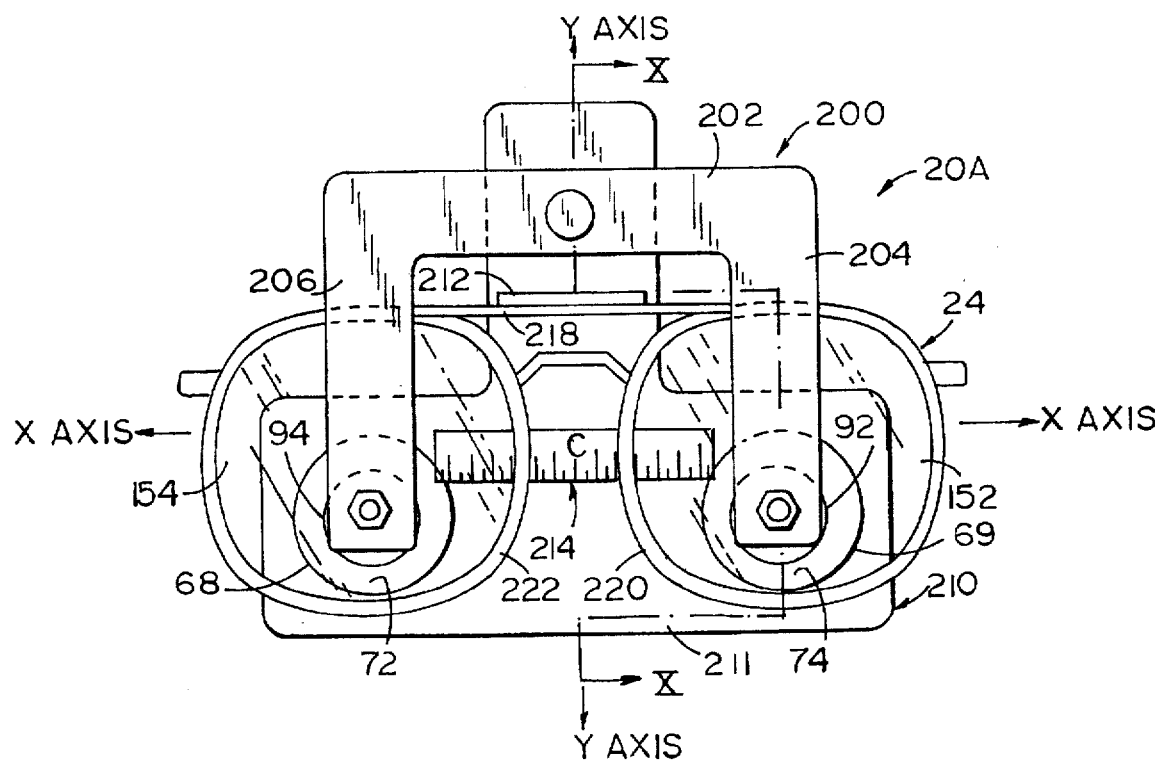
FIG. 9 is a top plan view of an alternate embodiment of an eyeglass holder for the system according to FIG. 1.
Figure 10:
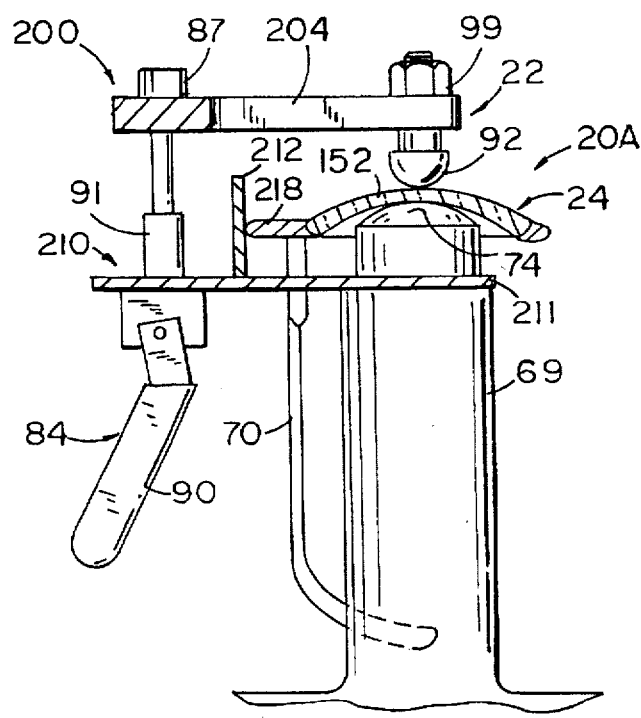
FIG. 10 is a side sectional view of the holder according to FIG. 9 taken along plane X—X in FIG. 9.

Holder 20A according to an alternate embodiment of the invention is illustrated in FIGS. 9 and 10. Holder 20 includes a generally U-shaped clamp bar 200 having a shoulder 202 and arms 204, 206 projecting substantially orthogonally from opposite ends of shoulder 202. Resilient caps 92, 94 are mounted to arms 204, 206 of clamp bar 200 using threaded nuts. 99, 101 as described above with reference to FIG. 3A. The clamp bar 200 is coupled to a clamp handle 90 (FIG. 10) of clamp 84 which is also described above with reference to FIG. 3A. Clamp 84 and clamp bar 200 are supported on clamp plate 210 in the same manner as clamp 84 and clamp bar 88 are supported on plate 78 (FIG. 3A). The clamp plate 210 is supported on columns 68, 69 in the same manner as plate 78, described above.

With continued reference to FIGS. 9 and 10, the clamp plate 210 includes a generally T-shaped platform 211. The clamp platform is manufactured of a rigid material such as a metal, a polymer, or the like. A brow bar stop 212 extends orthogonally from platform 211 and provides a Y-axis alignment member. Clamp plate. 210 also includes a scale 214 on platform 211. Scale 214 extends between columns 68, 69.

The scale includes uniformly spaced markings with a center mark "C" halfway between columns 68, 69. The scale is an X-axis (lateral) centerer. The scale 214 and brow bar stop 212 are preferably integral with platform 211, and may be integrally formed with the plate by suitable means such as molding, stamping, casting, or the like. Alternatively, brow bar stop 212 or scale 214 may be attached to platform 211 using an adhesive, threaded fasteners (not shown), snap-lock connectors (not shown), or the like.

Eyeglasses 24 are properly positioned in holder 20A according to the alternate embodiment illustrated in FIGS. 9 and 10 as follows. Eyeglasses 24 are positioned such that lenses 152, 154 of eyeglasses 24 rest on surfaces 72, 74, respectively. Brow bar 218 is positioned flush against brow bar stop 212. When brow bar 218 and brow bar stop 212 are in juxtaposition, eyeglasses 24 are properly positioned on the Y-axis. The eyeglasses are then slid laterally on the X-axis to a position where frame sections 220, 222 are spaced an equal number of scale units from the center "C" of scale 214. Clamp handle 90 is then pulled clockwise (in FIG. 10) which pulls resilient caps 92, 94 into engagement with lenses 152, 154, thereby clamping lens 152 of glasses 24 between clamp pad 92 and surface 74, as illustrated in FIG. 10. It will be recognized that clamp pad 94 will similarly clamp lens 154 against surface 72.

Figure 11:
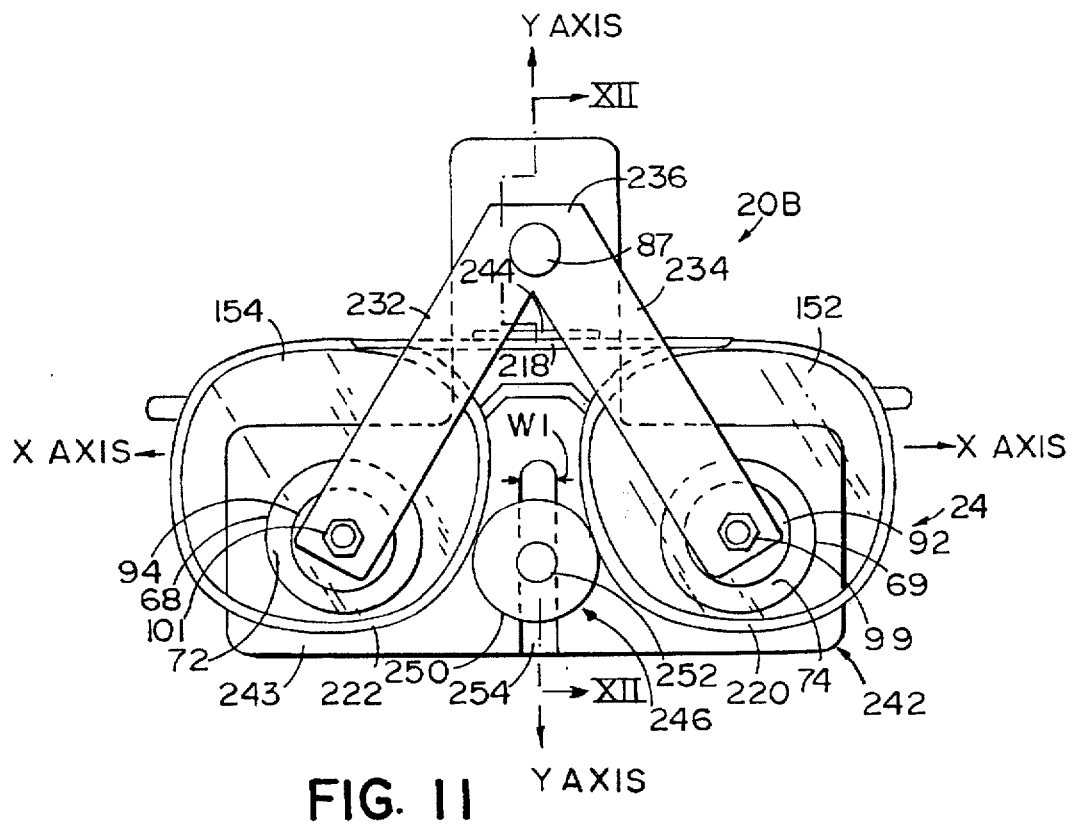
FIG. 11 is a top plan view of an alternate embodiment of an eyeglass holder for the system according to FIG. 1.
Figure 12:
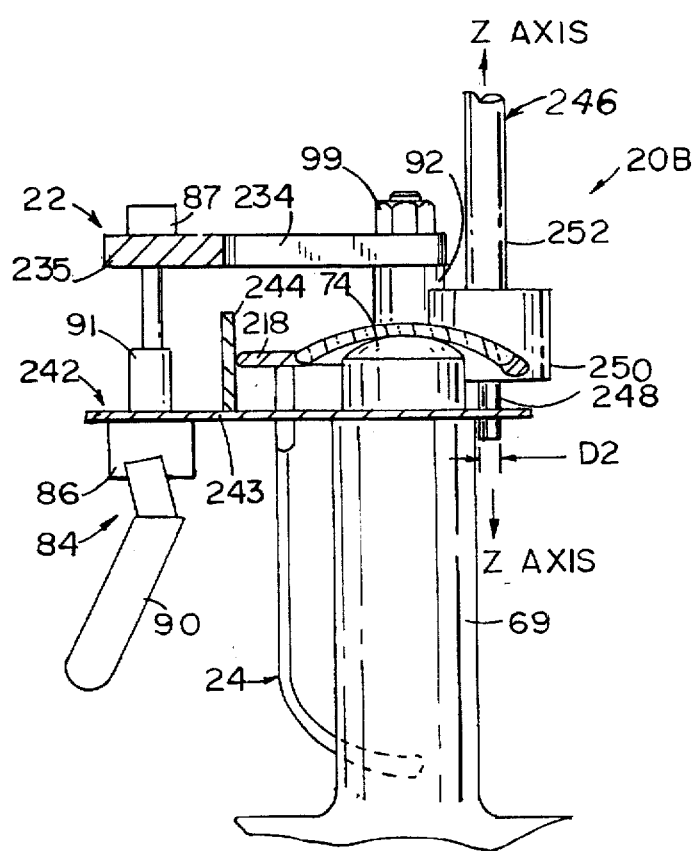
FIG. 12 is a side sectional view of the holder according to FIG. 11 taken along plane XII—XII in FIG. 11.

Holder 20B according to another alternate embodiment of the invention is illustrated in FIGS. 11 and 12. The holder includes a generally V-shaped clamp bar 230. Clamp bar 230 includes arms 232, 234 projecting from joiner 236. Clamp bar 230, like clamp bar 200, is rigid and is manufactured of a suitable material such as a metal or polymer. The clamp bar is manufactured by any suitable machining process, such as molding, stamping, casting or the like. Resilient caps 92, 94 are mounted to arms 232, 234 of clamp bar 230 using threaded nuts 99, 101, as described above with reference to FIG. 3A. The clamp bar is coupled to a clamp handle 90 of clamp 84, as also described above with reference to FIG. 3A. Clamp 84 and clamp bar 230 are supported on clamp plate 242 in the same manner as clamp 84 and clamp bar 88 are supported on plate 78 (FIG. 3A).

With continued reference to FIGS. 11 and 12, clamp plate 242 includes a generally T-shaped platform 243. Clamp plate 242 is manufactured of a rigid material such as metal, a polymer, or the like. A brow bar stop 244 projects orthogonally from plate 242 and provides a Y-axis alignment member.

Holder 20B includes an X-axis centerer 250 in a guide, or stylus, 246 (FIGS. 11 and 12) which is supported on shoulder 48 (FIG. 1) such that the stylus may be moved vertically (in the Z-axis). For example, the stylus can have a smaller diameter than the aperture (not shown) of shoulder 48 in which it is mounted such that the stylus slides vertically. Stylus 246 includes a cylindrical index and tracing end 248, a larger diameter cylindrical centerer 250 and a shaft 252 which extends up to shoulder 48 (FIG. 1). Platform 243 includes a slot 254 having a width "W" approximately equal to the diameter D2 (FIG. 12) of end 248. Most preferably, the width "W" of slot 254 is slightly larger than the diameter D2 of end 248, such that end 248 of the stylus may move freely along the longitudinal axis of the slot, but does not permit movement transversely to the longitudinal axis of the slot.

The clamp plate 242 includes integral brow bar 244. Brow bar 244 may be attached using a suitable adhesive, welding, or the like. Alternatively, clamp plate 242 may be integrally formed by molding, casting, or any other suitable machining process. Clamp plate 242 is mounted on columns 68, 69 in the same manner as plate 78 described above.

Eyeglasses 24 are properly positioned in holder 20B according to the alternate embodiment of the invention shown in FIGS. 11 and 12 as follows. Eyeglasses 24 are positioned on rounded support surfaces 72, 74 on top of columns 68, 69, respectively, such that lenses 152, 154 of eyeglasses 24 rest on surfaces 72, 74, respectively. Brow bar 218 of eyeglasses 24 is positioned flush against brow bar stop 244. In this juxtaposed position, the eyeglasses are properly positioned on the Y-axis of holder 20. Eyeglasses 24 are then slid laterally on the X-axis such that they appear to be centered. The operator then positions stylus 246 such that end 248 is in slot 254. When the stylus is moved along the Y-axis in slot 254, the centerer 250 comes into contact with sections 220, 222 of the frame of eyeglasses 24. The centerer pushes the eyeglasses laterally on the X-axis forcing the frame to move until sections 220, 222 of the frame of eyeglasses 24 both contact the centering member 246 and brow bar 218 is in juxtaposition with stop 244. The frame is thus centered by positioning eyeglass sections 220, 222 an equal distance from the center of member 250 (a distance equal to the radius of member 246).

Holder 20B is particularly advantageous for the following reasons. The V-shaped clamp allows cutting over substantially the entire circumference of eyeglasses 24. Because clamping bar 230 overlies the portion of the eyeglasses in contact with brow bar 244, which portion corresponds to the position where the brow bar of the clip-on sunglasses is located, this portion of the eyeglasses and sunglasses cannot be cut. Furthermore, the stylus 246 removes potential for human error by automatically centering the eyeglasses without requiring human judgement.

Figure 13:
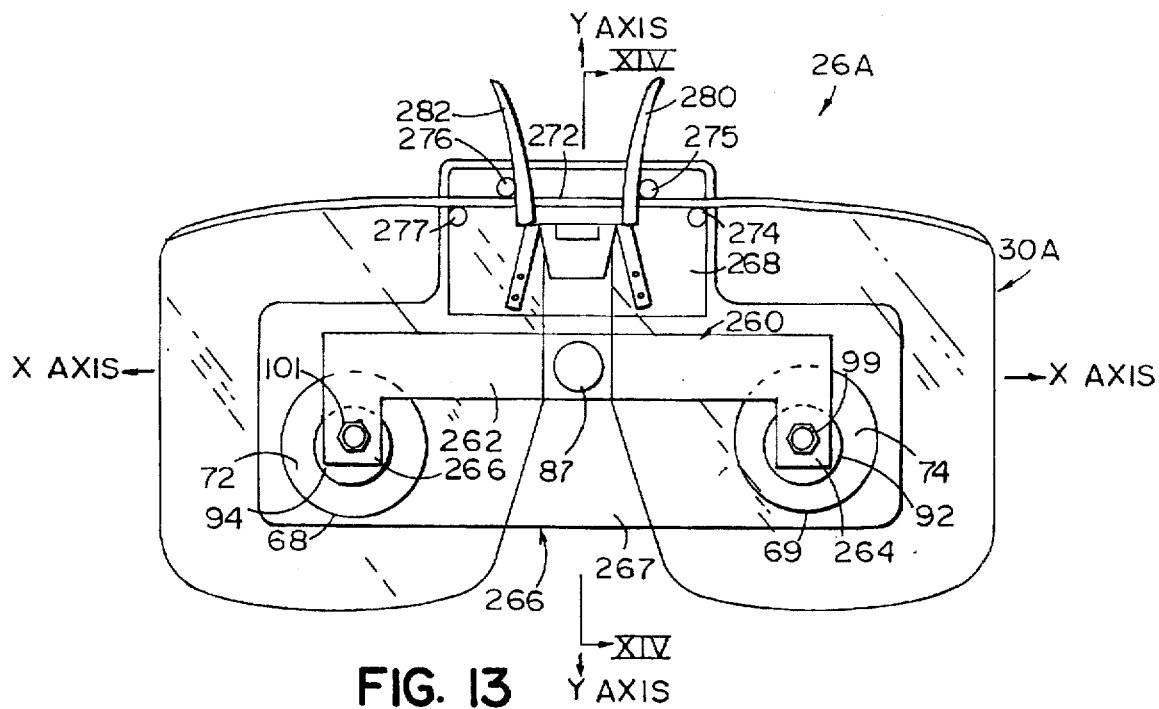
FIG. 13 is a top plan view of an alternate embodiment of a sunglasses holder for the system according to FIG. 1.
Figure 14:
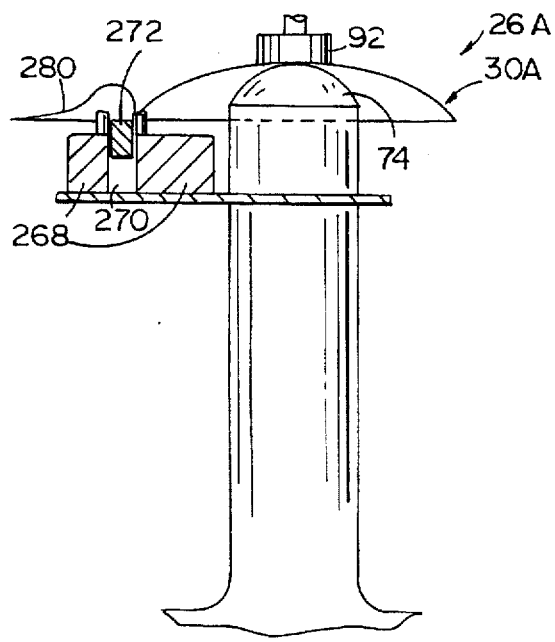
FIG. 14 is a side sectional view of the holder according to FIG. 13 taken along plane XIV—XIV in FIG. 11.

The sunglasses holder 26A, according to an alternate embodiment of the invention is illustrated in FIGS. 13 and 14. Holder 26A includes a U-shaped clamping member 260 having a shoulder 262 and projecting arms 264, 266. The clamping bar 260 is manufactured in the same manner as clamping bars 200, 230, described hereinabove. Although the U-shaped clamping bar 260 is illustrated in holder 26A, it will be appreciated that the V-shaped clamping bar shown in holder 20B of FIGS. 11 and 12 can be utilized in holder 26A. Resilient clamp pads 92, 94 are mounted to arms 264, 266 using threaded nuts 99, 101 described above with reference to FIG. 3A. The clamp bar is coupled to a clamp handle 90 of clamp 84 as is described above with respect to FIG. 3A. Clamp 84 and clamp bar 260 (FIG. 13) are supported on clamp plate 266 in the same manner as clamp 84 and clamp bar 88 are supported on plate 78 (FIG. 3A).

With continued reference to FIGS. 13 and 14, the clamp plate 266 includes a generally T-shaped platform 267. Clamp plate 266 is mounted on columns 68, 69 in the same manner as plate 78, which is described hereinabove. The plate is manufactured of a rigid material such as metal, a polymer, or the like. Clamp plate 267 includes a positioning block 268 having a channel 270 for receipt of a brow bar 272 of clip-on sunglasses 30A. The plate also includes projections 274, 275 which project generally orthogonally to plates 266.

With continued reference to FIGS. 13 and 14, the platform 267, the positioning blocks 268 and the projections 274–277 are preferably integrally formed by casting, molding, stamping, or the like. However, block 268 may be formed separately from platform 267 and attached using suitable means such as welding, an adhesive, threaded fasteners (not shown), a snap-fastener (not shown), or the like. The projections 274–277 may be pins attached to plates 266 using an adhesive, threading engagement, welding, or the like. The pins are preferably metal, although they could be made of a suitable polymer. Positioning block 268 and plates 266 may be manufactured of any suitable material such as a metal or a polymer.

Sunglasses 30A are properly positioned in holder 26A according to the alternate embodiment of FIGS. 13 and 14 as follows. Brow bar 272 of sunglasses clip-on 30A is positioned in channel 270 with the clip fingers 280, 282 flipped to the open position, as illustrated in FIG. 13. Fingers 280, 282 are positioned between projections 275, 276. This positions the sunglasses centrally on the X-axis. Projections 274, 277 provide additional support against rotation of the sunglasses when the sunglasses are cut. Thus, projections 274, 277 are provided as stabilizers whereas pins 275, 276 are centerers for X-axis centering. The brow bar slot 270 provides Y-axis positioning since the sunglasses will be properly positioned on the Y-axis when the brow bar is inserted into channel 270. With the sunglasses thus positioned, clamp handle 90 is pulled clockwise, as described above, with respect to FIG. 10 to clamp pad 92 (and similarly clamp pad 94) onto the sunglasses 30A.

Figure 15:
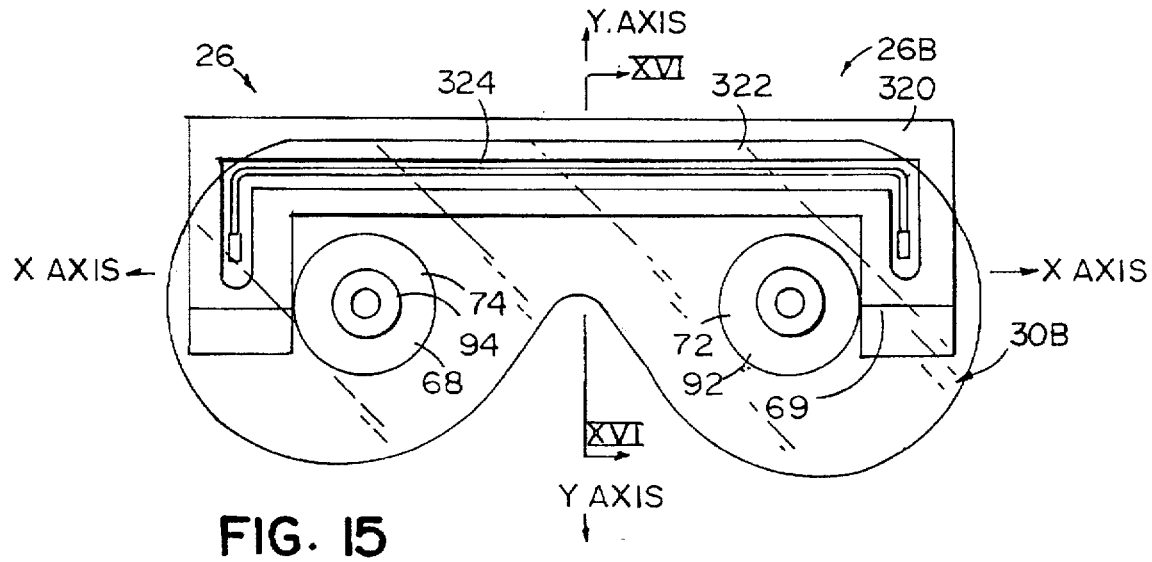
FIG. 15 is a top plan view of an alternate embodiment of a sunglasses holder for the system according to FIG. 1.
Figure 16:
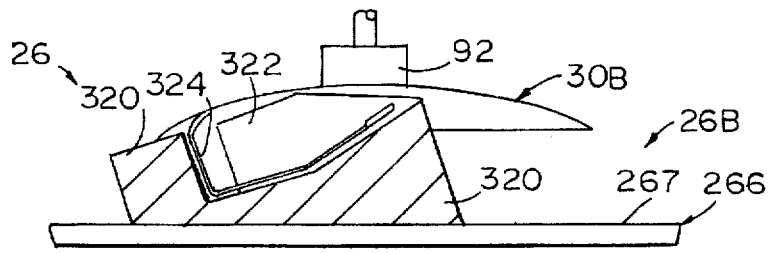
FIG. 16 is a side sectional view of the holder according to FIG. 15 taken along plane XVI—XVI in FIG. 15.
Figure 21:
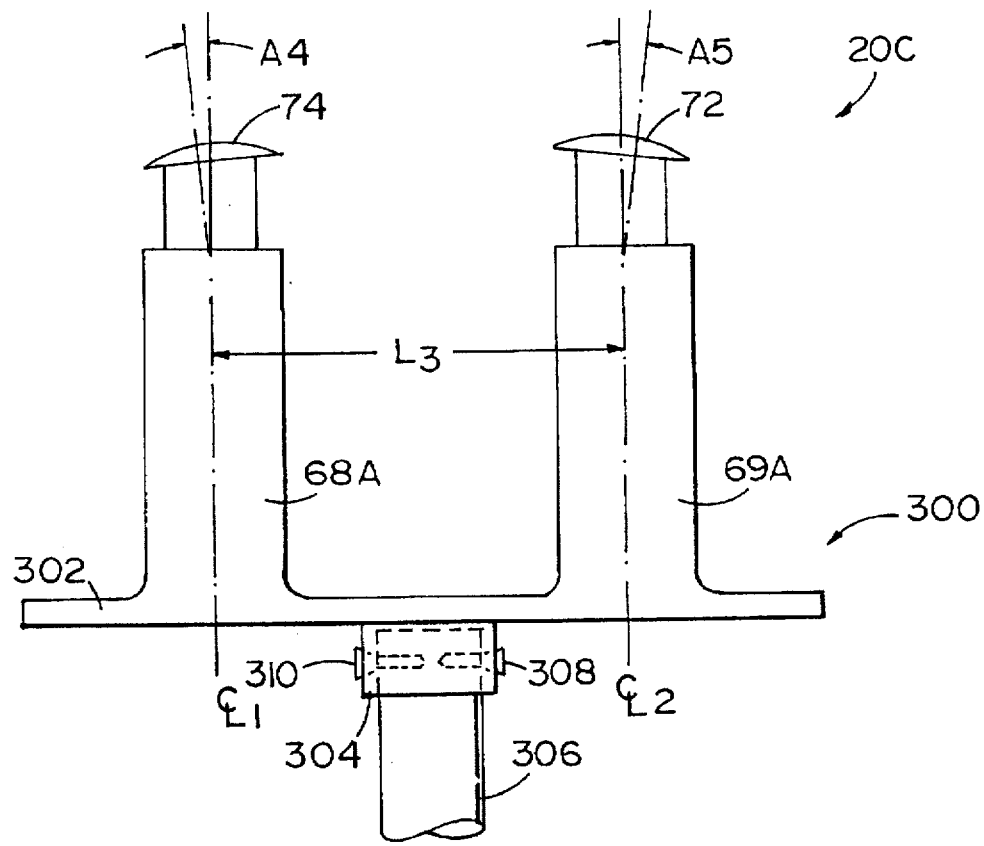
FIG. 21 is a fragmentary front elevational view of an alternate embodiment of an eyeglass holder for the system according to FIG. 1.
Figure 20:
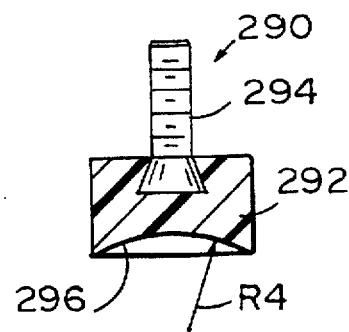
FIG. 20 is a sectional view of the clamp pad taken along plane XX—XX in FIG. 19.

Another sunglasses holder 26B is illustrated in FIGS. 15 and 16 for use with sunglasses 30B. According to this alternate embodiment, the positioning block 320 for a pair of sunglasses 322 includes a generally U-shaped channel 322. The channel receives the sunglasses clips 324. When the eyeglasses are positioned on surfaces 72, 74 of columns 68, 69 with the sunglasses clip 324 positioned in channel 322 of positioning block 320, the sunglasses will be properly positioned. Another sunglasses holder 26C is illustrated in FIGS. 20 and 21 for use with sunglasses 26C. According to this alternate embodiment, the positioning block 324 is rectangular in shape and includes a generally H-shaped channel 332. When clip 334 of sunglasses 335 is positioned within the channel 332 of positioning block 330, sunglasses 335 will be properly positioned for cutting. As will be appreciated, the positioning block will be attached to the clamping plate 266 using a suitable adhesive, welding, or a fastener. Alternatively, the positioning block may be integrally formed with plate 266. Centering blocks 320, 330 are manufactured from any suitable material such as a polymer or a metal.

Figure 19:
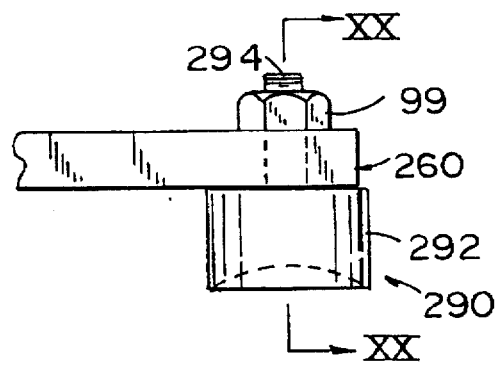
FIG. 19 is a side elevational view of a clamp pad for the holder used in the system according to FIG. 1; .

A clamp pad 290, according to an alternate embodiment of the invention, is illustrated in FIGS. 19 and 20. Clamp pad 290 is used primarily on the sun clip holders 26, 26A, 26B, and 26C, although it could be utilized with eyeglass holders 20, 20A, and 20B. Clamp pad 290 includes a resilient contact 292 and a support rod 294. The support rod may be implemented using a five-sixteenths inch, one inch long, flathead screw. A suitable material, such as Kraylon is molded around the head of screw 294. The diameter of the clamp pad is preferably between three quarters of an inch and one and one-half inches, and preferably has a diameter of one and one-eights inches. The contact side 296 of the clamp pad is concave, having a radius of curvature R4 which is between three and four inches, and most preferably a radius of curvature of three-and-four-tenths inches. These clamp pads are particularly advantageous because they have an increased surface area and create a slight suction when the clamp pad is clamped onto the sunglasses 30, 30A, 30B, 30C. This suction and larger contact area holds the sunglasses securely providing additional stability which results in a better finish of the cut edge of the clip-on sunglasses. The clamp pad is secured to the clamp bar using a five-sixteenths inch nut.

A holder 20C according to another alternate embodiment of the invention is illustrated in FIG. 21. Holder 20C includes a clamp mounting plate 300 includes columns 68A and 69A extending substantially orthogonally from platform 302. A flange 304 extends downwardly from platform 302 for receipt of a column 306, although it is envisioned that the flange 304 can be received in a hollow recess in the top of column 306. Column 306 extends upwardly from base platform 18 (FIG. 1). Column 306 takes the place of columns 68, 69. Threaded fasteners 308, 310 are inserted through flange 304 and engage threaded apertures in column 306 to secure the clamp mounting plate 300 on column 306. The clamp mounting plate is preferably manufactured of a suitable material such as a metal or a polymer by casting, molding, or the like.

Holder 20C includes a clamp bar and centerer as described above with reference to holders 20, 20A, and 20B, although they are not illustrated herein for brevity. Holder 20C includes a clamp plate 300 having columns 68A, 68B spaced at a distance L3, which is approximately 60–64 mm and most preferably is about 62 mm. The surfaces 72, 74 are tilted with respect to the substantially vertical longitudinal axis CL1 or CL2 of columns 68A, 69A. Angles A4, A5 are between 0 and 5 degrees, and most preferably are about 3 degrees. Additionally, the radius of the curvature of surfaces 72, 74 are between 3 and 4 inches, and most preferably are approximately 3.4 inches. The spacing of columns 68, 69 at 62 mm is equal to the average pupillary distance of eyeglasses 24 and the angle of 3 degrees for angles A4 and A5 is the average time curvature of prescription eyeglasses. By angling and spacing surfaces 72, 74 in this manner, the surfaces provide a very stable platform for the eyeglasses 24 when the eyeglasses are clamped onto surfaces 72, 74.

Figure 17:
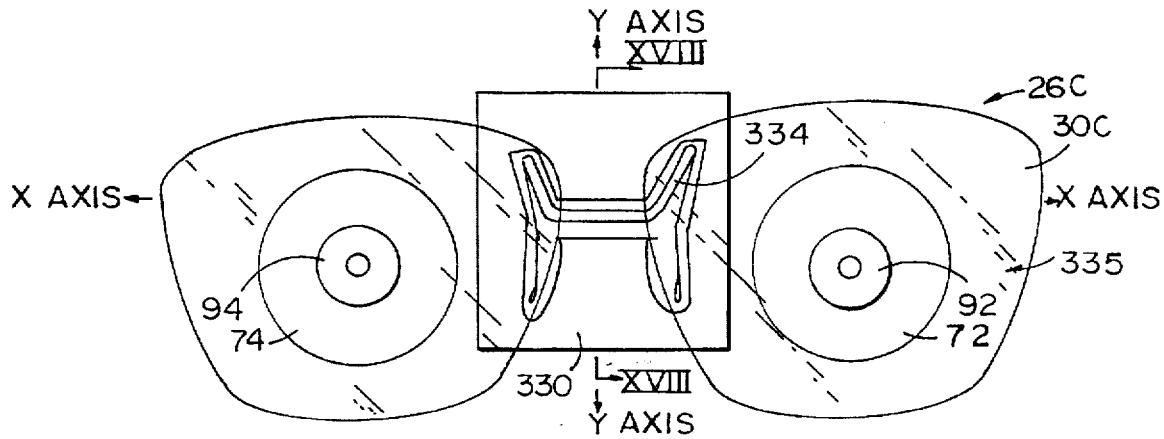
FIG. 17 is a top plan view of an alternate embodiment of a sunglasses holder for the system according to FIG. 1.
Figure 18:
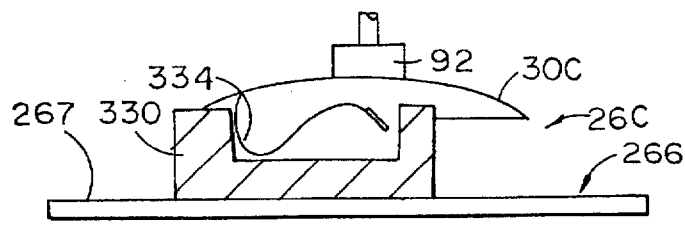
FIG. 18 is a side sectional view of the holder according to FIG. 17 taken along plane XVIII—XVIII in FIG. 17.

It is envisioned that clamp mounting plates 266 of holders 26A (FIG. 13), 26B (FIG. 15), and 26C (FIG. 17) may also be integrally formed with the upper portion of columns 66, 67 extending upwardly from plate 266 in the same manner as holder 20C. The two respective columns 66, 67 below the mounting plate may then be replaced by a single column (not shown) in the same manner as column 306 replaces columns 68, 69 as described above. The integral unit including the clamp plate 266 and the portion of columns 66, 67 extending upwardly from the clamp plate and including surfaces 72, 74, are attached to the top of the single column (not shown) using threaded fasteners (not shown), a snap connector, or the like. This arrangement permits quick substitution of clamp plates for different types of clip-on sunglasses.

Alternatively, it is envisioned that fasteners (not shown may be used for mounting the positioning blocks 268, 320, 330 on platform 267. The positioning blocks may then be changed to accommodate different eyeglasses. Thus, it is envisioned that either the position block, or the clamp plate, can be selected and substituted, to accommodate the type of sunglasses to be cut.

Figure 22:
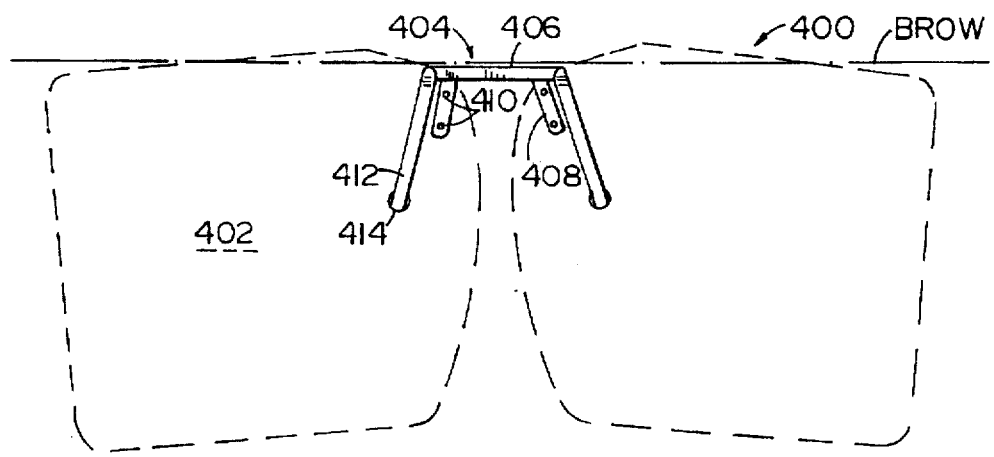
FIGS. 22–24 illustrate different embodiments of sunglasses blanks constituting a part of the invention.
Figure 23:
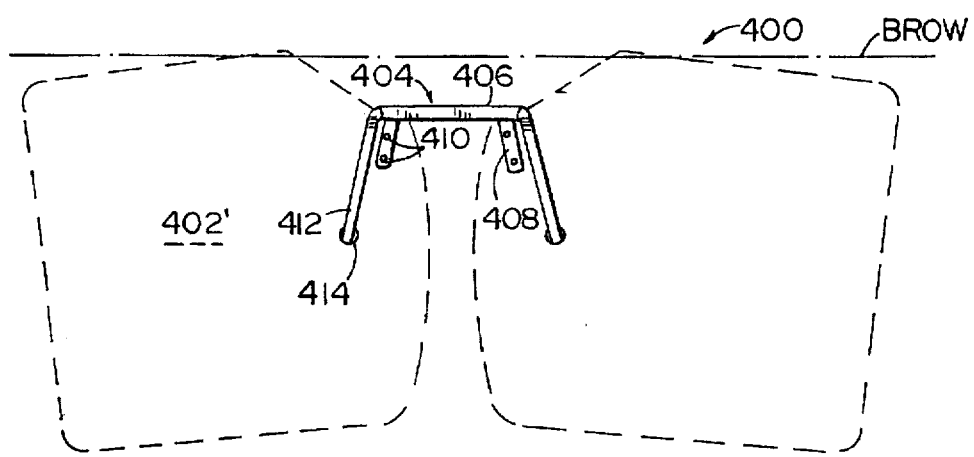
Figure 24:
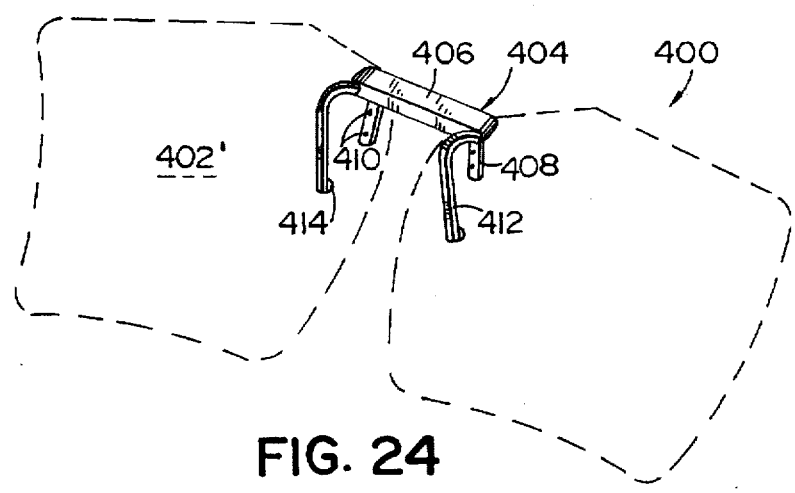

Yet another embodiment of sunglasses holder, described in greater detail below, is used to retain clip-on sunglasses blanks 400 such as shown in FIGS. 22–24 in the cutter. Each blank 400 includes a pair of sunglass lenses 402 spaced apart with respect to each other and attached to a clip assembly 404. Clip assembly is preferably made from a polymeric material such as, Acetal plastic or resin using injection molding techniques. Each clip assembly 404 includes a bridge 406 spanning the gap "G" between the two lenses 402. The bridge preferably has dimensions of approximately 0.10 inch thick by 0.20 inch wide by 0.95 inch long and includes a pair of tabs 408, each extending downwardly from opposite ends of the bridge 406 and attached to the lenses 402 by rivets 410 or similar fasteners. Also extending from opposite ends of the bridge 406, and from a side opposite that having tabs 408, are a pair of clips or arms 412 which extend in an arc from bridge 406 downwardly such that rounded ends 414 lightly engage each lens. Each clip is angled slightly away from a center line in gap "G" intermediate each lens.

Each lens 402 of blank 400 is larger than a conventional lens such that it may be trimmed to conform to a pair of eyeglasses. To make the clip appear less obtrusive while on the eyeglasses, the bridge 406 is located differently with respect to a given set of lenses. For example, if the eyeglasses to receive the clip-ons had a bridge near the brow of the glasses, the lenses would be located with respect to the bridge so that little lens material is provided above the bridge as seen in FIG. 22. It is preferred that each embodiment of the sunglasses blank have specific dimensions or ratio of dimensions in the gap "G" between the lenses 402 and below the bridge 406 which define a trapezoid. Approximately 0.3 to 0.5 inch below the bridge, the width between the lens blanks 402 is approximately 0.5 inch, preferably less than 0.5 inch and most preferably 0.45 inch. The width of the gap "G" immediately adjacent the bottom of bridge 406 is greater than 0.5 inch, preferably less than 0.6 inch, and most preferably 0.51 to 0.55 inch.

Figure 26:
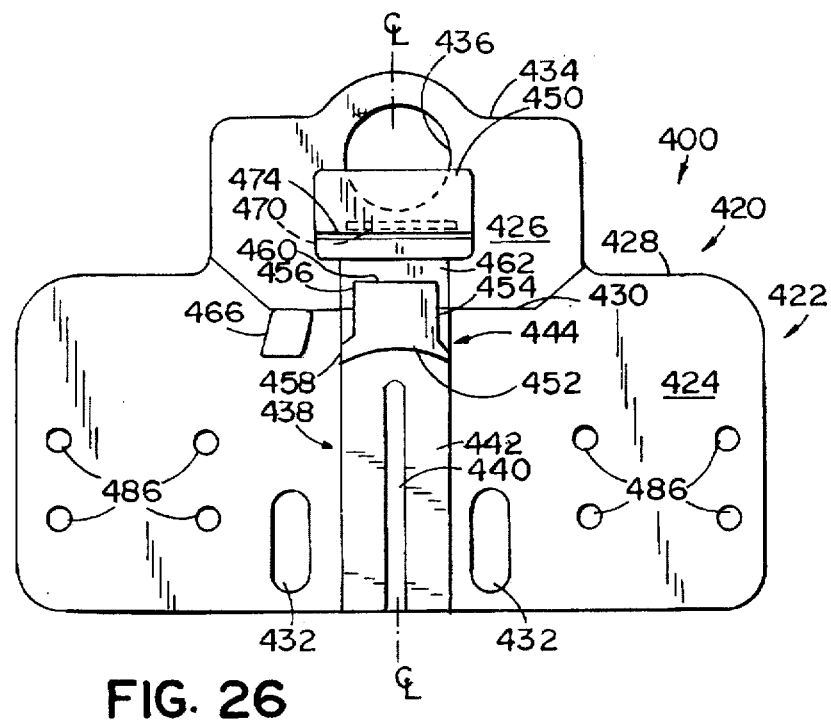
Figure 27:
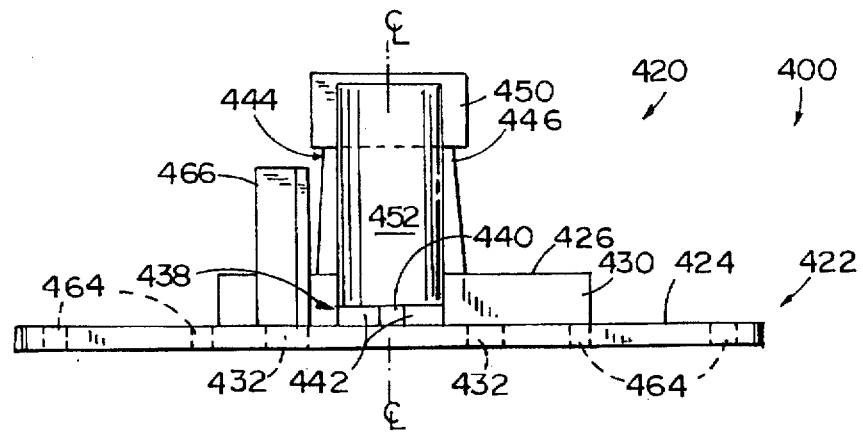
Figure 28A:
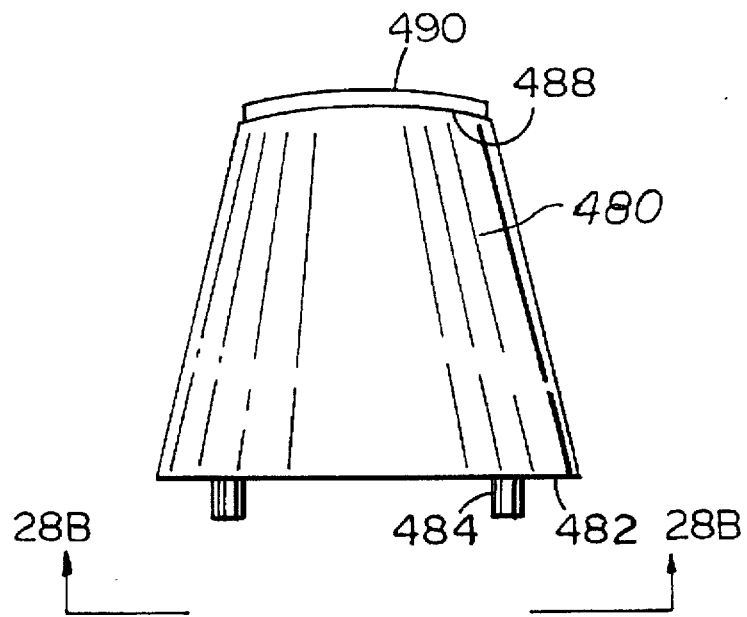
FIGS. 28A and 28B illustrate elevation and bottom views of one embodiment of a lens support post used in association with the blank holder.
Figure 28B:
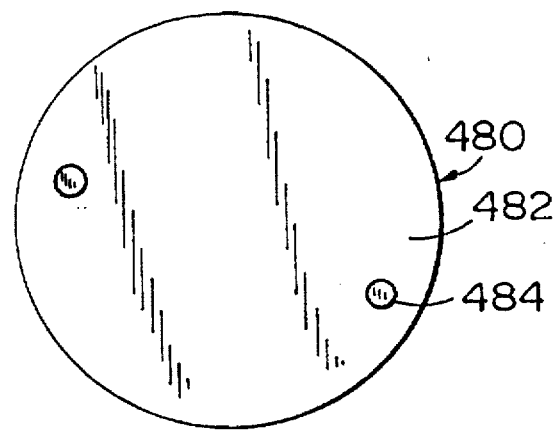

The sunglasses blanks 400 described above are retained in a specially designed blank holder 420 (FIGS. 25–27) for the purpose of locating and aligning the blank 400 on the cutter such as described above. Blank holder 420 includes a bases 422 having a first portion 424 generally rectangular in plan view, and a second portion 426 smaller in area than the first portion and extending outwardly from an edge 428. The second portion 426 has a height greater than that of the lower portion 424 defining a step or rise 430 therebetween. Extending through base 422 proximate an edge opposite 428 are a pair of holes 432, each disposed on opposite sides of an imaginary center line transverse to the long axis of rectangular plan form of the base. Each hole is eccentric or elongate in a direction generally parallel the imaginary center line. Holes 432 are intended to receive fasteners extending from an end of a post (not shown) extending upwards from receptacle 56, or otherwise from clamping plate 266 described above in relation to FIGS. 20 and 21. Opposite holes 432, and extending through base portion 426 proximate peripheral edge 434, is a threaded hole 436, for positioning and fixing clamp assembly 22 with respect to blank holder 420 similar to that described and shown in FIG. 3A. The principles of operation of clamp assembly 22 are the same with respect to this embodiment.

Figure 25:
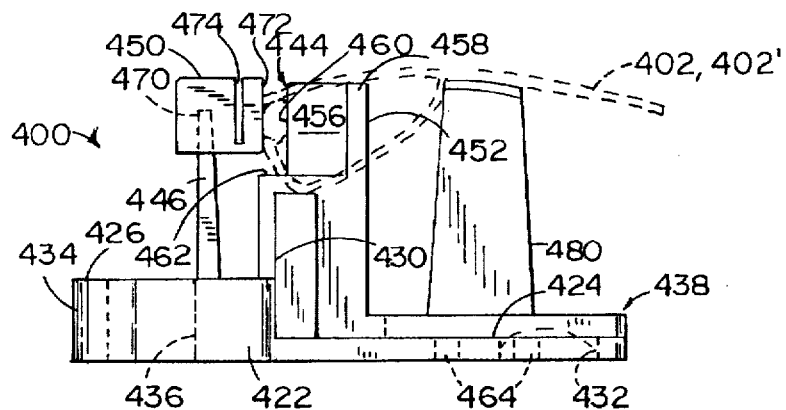
FIGS. 25–27 illustrate an alternate embodiment of a blank holder of the invention.

Extending from base portions 424 and 426, and aligned generally along the imaginary transverse center line CL is an elongate platform region 438 containing a calibration channel 440 located partway along the centerline CL between flanges 442. One end of flanges 442 and channel 440 terminate at a peripheral edge of the base. The opposite ends of the channel and flanges terminate in the platform 438 which, in turn, terminates in a centrally located centering column or post 444 of substantially greater relief than any other component of the holder 420 described so far. Adjacent centering post 444 on a side opposite platform 438, and extending upwardly from base portion 426 is a second post 446. In profile as shown in FIG. 25, the post 446 is tapered and is received in a cavity 448 formed in the bottom of a locating block 450 described in greater detail below.

The elements comprising the blank holder as described so far, with the exception of locating block 450 may be made from metal, preferably aluminum. It is also preferred that it be formed as a single piece using casting techniques, and later machined to the desired tolerances. For example, post 444 may be machined to produce a radius along face 452 extending from platform 438. Sides 454 and 456 lateral to face 452 may also be machined to produce a pair of flanges, each on one side, 454, 456 and adjacent face 452. Side 460 opposite face 452 is preferably cut so as to lie generally in the same vertical plane containing step or rise 430, and terminating in a shoulder 462 defined at a height approximately midway up along face 452. The dimensions of post 444 are machined so as to accept sunglasses blank 400 in the area of the bridge described above, and described in greater detail below.

The locating block 450 briefly mentioned earlier may be made from a variety of materials, although Acetal plastic or resin is preferred. In this embodiment, block 450 is in the shape of a rectangular solid having a lower cavity 470 conformed to receive post 446. It is also desired that block 450 be machined or otherwise formed such that one side 472 is opposite to, and generally parallel to, face 460 and spaced therefrom by a distance described below. To make the face 472 somewhat resilient, a deep channel 474 paralleling side 472 may be cut into the block from either the top or bottom to provide room for side 472 to flex slightly.

Blank holder 420 is intended to receive and retain sunglass blanks 400 so they may be cut in a shape to match the exterior profile of the eyeglasses frames. The blank 400 is located on holder 420 such that bridge 406 of the blank is received in the gap between centering post 444 and locating block 450. The dimension of the gap is just slightly greater than that of the bridge so that the blank may be inserted and removed. Post 444, along with flanges 458 extending therefrom, is dimensioned so as to be received in the space between the lenses of the blank immediately below the bridge. Each lens 402 may be supported by a lens support post 480 detachably mounted to base portion. Lens support posts 480 may be made from a variety of materials such as plastic or metal, and includes a base 482 or bottom having locating pins 484 extending therefrom to be located in keyed holes 486 formed in base 422. In this manner, each post is precisely located beneath each lens. The upper surface 488 of each support post 480 is slightly rounded and may be covered with a resilient material so as not to scratch the lens. The blank is then clamped onto the holder in the same fashion as described earlier.

Blank holder 420 may be intended to work with a specific sunglass blank design such as that described above. In accordance with such intention, and further to gauge the distance bridge 406 is inserted into the gap between centering post 444 and mounting block 450, a rest of stop 466 may extend from base 422 at a point designed to engage a portion of the blank 400. In a preferred embodiment such as shown in the figures, rest or stop 466 extends from base 422 adjacent side 456 of centering post 444 to engage the farthest point on leg 412 away from the lenses 402, 402'. Using such a stop or rest 466, together with support post 480, each blank 400 is located at the appropriate height 50 that the routing cutter will contact the entire peripheral edge of each lens.

A substantially similar holder may be used to retain the eyeglasses. One difference in the eyeglasses holder would be that the centering post is absent such that only a platform is defined above the base at approximately the same height as the shoulder 462 described earlier. A post or stop would be located at one end of the platform to engage the brow portion or frame of the eyeglasses. At the base of the platform a calibration channel is defined so that the eyeglass holder can be located with respect to holder 420. In addition, the calibration channel assists in centering the eyeglasses on the holder with the aid of a bushing received on the stylus (not shown). The bushing is placed over the stylus, and the stylus tip is placed in the calibration channel and slid up between the lenses. The bushing engages both lenses and thus moves the eyeglasses left or right on the holder. To insure that the eyeglasses are square with respect to the holder, a second gauge may be attached to an opposite side and may include a block slidably disposed on one or two rods attached to the underside of the holder base. The block may be slid up against the eyeglasses to engage the brow portion, thus squaring the frames on the holder. With the frames squared and centered on the holder, the eyeglasses may be clamped in place as described earlier so that they may be traced with the stylus and the blank may be cut.

It can be seen that an apparatus is disclosed which may be used to custom cut clip-on sunglasses. The apparatus is easy to use, such that an unskilled operator may cut the sunglasses. Opticians may utilize the apparatus to cut the sunglasses without error such that they do not waste the sunglass blanks by incorrectly cutting them.

In the foregoing description, it will be readily perceived by those skilled in the art that modifications may be made without departing from the concepts disclosed herein. Such modifications are to be considered included in the following claims, unless the claims by their language expressly state otherwise.

The embodiments of the invention in which an exclusive property or privilege is claimed are defined as follows:

1. An apparatus for positioning a clip-on sunglasses blank in a system for cutting the blank to the shape and size of a pair of eyeglasses, the blank having a pair of lens interconnected by a bridge, comprising:

a body;

a first holder supported on said body for holding the eyeglasses, said holder including support surfaces upon which the eyeglasses are retained;

a second holder supported on said body and spaced from said first holder, gripping said blank; and a centerer holder such that said centerer is utilized to laterally center the eyeglasses blank on said first holder.

2. The apparatus as defined in claim 1, wherein said centerer in relation to said second holder includes a mounting block and a post.

3. The apparatus as defined in claim 1, wherein said second holder includes:

a base attached to said body by a support;

a first post extending from said base;

a second post extending from said base and spaced from said first post; and a mounting block mounted on said second post so as to define a set distance between a face of said mounting block and said first post for receiving the bridge of the blank.

4. The apparatus as defined in claim 3, wherein said first post is dimensioned to be received between the pair of lenses of the blank in a space adjacent the bridge.

5. The apparatus as defined in claim 1, further including a lens support post detachably received on said second holder beneath each lens of the blank for supporting the lenses thereon.

6. The apparatus as defined in claim 3, wherein said mounting block includes a resilient wall on said side adjacent said first post.

7. The apparatus as defined in claim 6, wherein said mounting block is formed from a polymeric material.

8. The apparatus as defined in claim 5, wherein said lens support post includes:

at least one pin extending from a base of said support post to engage at least one hole in said base for positioning said support post on said base; and a resilient pad attached to an opposite end of said support post for engaging the lens of the blank.

9. The apparatus as defined in claim 5, further including at least one threaded hole extending through said base proximate a peripheral edge thereof for coupling a clamp thereto for holding the lenses against each lens support post when in the clamped position.

* * * * *

UNITED STATES PATENT AND TRADEMARK OFFICE
CERTIFICATE OF CORRECTION

PATENT NO. : 5,674,113
DATED : October 7, 1997
INVENTOR(S) : Ronald L. Underwood It is certified that error appears in the above-identified patent and that said Letters Patent is hereby corrected as shown below:

Column 1, line 7;

"continution" should be --continuation--.

Column 6, line 18;

"mourning" should be --mounting--.

Column 7, line 41;

"am" should be --are--.

Column 11, line 27;

"sunglasses 322" should be --sunglasses 30B--.

Column 11, line 56;

"one eights" should be --one-eighths--.

Column 12, line 48;

"(not shown" should be --(not shown)--.

UNITED STATES PATENT AND TRADEMARK OFFICE
CERTIFICATE OF CORRECTION

PATENT NO. : 5,674,113
DATED : October 7, 1997
INVENTOR(S) : Ronald L. Underwood It is certified that error appears in the above-identified patent and that said Letters Patent is hereby corrected as shown below:

Column 13, line 29;

"bases" should be --base--.

Column 14, line 50;

"rest of" should be --rest on--.

Signed and Sealed this

Seventeenth Day of March, 1998

Attest:

BRUCE LEHMAN

Attesting Officer

Commissioner of Patents and Trademarks